(12) United States Patent
Oguchi

(10) Patent No.: US 10,156,459 B2
(45) Date of Patent: Dec. 18, 2018

(54) OPTICAL ENCODER UNIT, AND OPTICAL ENCODER

(71) Applicant: NSK LTD., Tokyo (JP)

(72) Inventor: Toshiaki Oguchi, Kanagawa (JP)

(73) Assignee: NSK LTD., Shiagawa-ku, Tokyo (JP)

( * ) Notice: Subject to any disclaimer, the term of this patent is extended or adjusted under 35 U.S.C. 154(b) by 0 days.

(21) Appl. No.: 15/034,076

(22) PCT Filed: Oct. 31, 2014

(86) PCT No.: PCT/JP2014/079131
§ 371 (c)(1),
(2) Date: May 3, 2016

(87) PCT Pub. No.: WO2015/068662
PCT Pub. Date: May 14, 2015

(65) Prior Publication Data
US 2016/0282149 A1    Sep. 29, 2016

(30) Foreign Application Priority Data

Nov. 5, 2013   (JP) ................................. 2013-229565

(51) Int. Cl.
*G01D 5/34* (2006.01)
*G01D 5/347* (2006.01)

(52) U.S. Cl.
CPC .......... *G01D 5/3473* (2013.01); *G01D 5/344* (2013.01); *G01D 5/345* (2013.01); *G01D 5/34707* (2013.01); *G01D 5/34715* (2013.01)

(58) Field of Classification Search
CPC .......... G01D 5/34; G01D 5/341; G01D 5/342; G01D 5/344; G01D 5/345; G01D 5/347;
(Continued)

(56) References Cited

U.S. PATENT DOCUMENTS

| 4,922,095 | A | | 5/1990 | Gergely |
| 5,844,673 | A | * | 12/1998 | Ivers .................. G01D 5/34715 250/231.13 |

(Continued)

FOREIGN PATENT DOCUMENTS

| CN | 1171560 A | 1/1998 |
| CN | 1435675 A | 8/2003 |

(Continued)

OTHER PUBLICATIONS

Partial Communication dated May 31, 2017, from the European Patent Office in counterpart European application No. 14860233.7.

(Continued)

*Primary Examiner* — Kevin Pyo
(74) *Attorney, Agent, or Firm* — Sughrue Mion, PLLC

(57) ABSTRACT

An optical encoder unit includes: a light source having a predetermined light distribution; an optical scale having a polarizer whose polarization direction on a plane is along a predetermined direction, and whose polarization direction is changed according to rotation; and an optical sensor unit including a first photoreceiver, a second photoreceiver, a third photoreceiver, and a fourth photoreceiver for receiving incident light that is light source light from the light source made incident on the respective photoreceivers by passing through or being reflected by the optical scale. An emitting surface of the light source and the optical sensor unit are arranged at positions so as to receive a light intensity that is predetermined times greater or more than that corresponding to dark current of the optical sensor.

8 Claims, 18 Drawing Sheets

(58) Field of Classification Search
CPC ........... G01D 5/34707; G01D 5/34715; G01D 5/34723; G01D 5/3473; G01D 5/34738; G01D 5/34746; G01D 5/34753; G01D 5/34761; G01D 5/34769; G01D 5/34776
USPC ........................................ 250/231.13, 231.14
See application file for complete search history.

(56) References Cited

U.S. PATENT DOCUMENTS

| | | | |
|---|---|---|---|
| 5,981,941 | A | 11/1999 | Takata et al. |
| 6,835,924 | B2 | 12/2004 | Kawano et al. |
| 6,921,893 | B1* | 7/2005 | Petschik ............ G01D 5/34715 250/221 |
| 7,098,446 | B2 | 8/2006 | Kojima |
| 7,329,858 | B2 | 2/2008 | Okada |
| 8,895,911 | B2 | 11/2014 | Takahashi |
| 9,410,858 | B2* | 8/2016 | Oguchi ................ G01D 5/3473 |
| 2001/0042861 | A1 | 11/2001 | Kano |
| 2008/0186491 | A1 | 8/2008 | Baxter et al. |
| 2008/0237455 | A1 | 10/2008 | Ishida et al. |
| 2013/0279077 | A1 | 10/2013 | Djebara et al. |
| 2014/0306099 | A1 | 10/2014 | Oguchi et al. |
| 2014/0311258 | A1 | 10/2014 | Oguchi et al. |
| 2014/0360804 | A1 | 12/2014 | Oguchi et al. |

FOREIGN PATENT DOCUMENTS

| | | | |
|---|---|---|---|
| CN | 1550761 | A | 12/2004 |
| CN | 1670485 | A | 9/2005 |
| CN | 1683907 | A | 10/2005 |
| EP | 2657652 | A1 | 10/2013 |
| JP | 61-225626 | A | 10/1986 |
| JP | 6-174494 | A | 6/1994 |
| JP | 9-297040 | A | 11/1997 |
| JP | 2000-22196 | A | 1/2000 |
| JP | 2002-208725 | A | 7/2002 |
| JP | 2007-202328 | A | 8/2007 |
| JP | 2008-243869 | A | 10/2008 |
| JP | 2009-086609 | A | 4/2009 |
| JP | 2009-238792 | A | 10/2009 |
| JP | 2011-185810 | A | 9/2011 |
| JP | 2012-168167 | A | 9/2012 |
| WO | 2013/065737 | A1 | 5/2013 |
| WO | 2013/065739 | A1 | 5/2013 |
| WO | 2013/065753 | A1 | 5/2013 |

OTHER PUBLICATIONS

Communication dated Mar. 22, 2017 from the State Intellectual Property Office of the P.R.C. in counterpart Application No. 201480059252.X.
Communication dated Dec. 5, 2017 from the Japanese Patent Office in counterpart application No. 2014-024887.
International Search Report of PCT/JP2014/079131 dated Jan. 27, 2015.

* cited by examiner

OPTICAL ENCODER UNIT, AND OPTICAL ENCODER

CROSS REFERENCE TO RELATED APPLICATIONS

This application is a National Stage of International Application No. PCT/JP2014/079131 filed Oct. 31, 2014 claiming priority based on Japanese Patent Application No. 2013-229565, filed Nov. 5, 2013, the contents of which are incorporated herein by reference in their entirety.

BACKGROUND OF THE INVENTION

1. Field of the Invention

The present invention relates to an optical encoder unit and an optical encoder for detecting an absolute angle by using an optical scale.

2. Description of the Related Art

Encoders are used in various mechanical devices to detect the position or the angle of a movable component. Generally, there are encoders that detect a relative position or angle, and encoders that detect an absolute position or angle. There are optical encoders and magnetic encoders, and the optical encoders are more affected by foreign substances and the like, and by fluctuations in the amount of detected light.

Prior Art 1 discloses a technique for reducing the influence of fluctuations in the amount of detected light, and for improving the resolution.

PRIOR ART

Prior Art 1: WO 2013/065737 A

According to the technique of Patent Literature 1, the influence of fluctuations in the amount of detected light is reduced, but it is premised that the optical axis is accurately adjusted.

The present invention has been made in view of the above, and is directed to providing an optical encoder unit and an optical encoder which are capable of reducing the influence of fluctuations in the amount of detected light and of easing accurate adjustment of the optical axis.

SUMMARY OF THE INVENTION

According to an aspect of the present invention in order to solve the above-mentioned problems and achieve the purpose, there is provided an optical encoder unit including: a light source having a predetermined light distribution; an optical scale having a polarizer whose polarization direction on a plane is along a predetermined direction, and whose polarization direction is changed according to rotation; and an optical sensor unit including a first photoreceiver, a second photoreceiver, a third photoreceiver, and a fourth photoreceiver for receiving incident light that is light source light from the light source made incident on the respective photoreceivers by passing through or by being reflected by the optical scale, wherein an emitting surface of the light source and the optical sensor unit are arranged at positions so as to receive a light intensity that is predetermined times greater or more than that corresponding to dark current of the optical sensor.

Such a structure enables the optical encoder unit to increase the SN ratio and enhance the measurement accuracy. Further, the positional relationship between the light source and the optical sensor unit eases the accurate adjustment of the optical axis to be required. Accordingly, the optical encoder unit can be miniaturized.

According to a preferred aspect, it is preferable that the emitting surface of the light source and the optical sensor unit are arranged at positions so as to receive a light intensity that is 100 times greater or more than that corresponding to the dark current of the optical sensor unit. With this structure, the optical encoder unit can improve the SN ratio and enhance the measurement accuracy.

According to a preferred aspect, it is preferable that the emitting surface of the light source and the optical sensor unit are arranged at positions so as to receive a light intensity that is 1000 times greater or more than that corresponding to the dark current of the optical sensor unit. With this structure, the optical encoder unit can improve the SN ratio and enhance the measurement accuracy.

According to a preferred aspect, it is preferable that the first photoreceiver, the second photoreceiver, the third photoreceiver, and the fourth photoreceiver are respectively arranged at an equal distance from an arrangement center, and the first photoreceiver, the second photoreceiver, the third photoreceiver, and the fourth photoreceiver are arranged within a range in which the light distribution of the light source is uniform and receive light. With this structure, the optical sensor unit can be arranged at a position within a range such that the optical sensor unit can receive light with the influence of light scattered by the light source being reduced. Further, the optical encoder unit can suppress the influence by the light intensity of the light source, and reduce the influence on the output of the optical encoder unit by the distance between the optical sensor unit and the optical scale, the fluctuation in the light intensity of the light source, and the like.

According to a preferred aspect, it is preferable that the first photoreceiver, the second photoreceiver, the third photoreceiver, and the fourth photoreceiver receive light by polarizing layers that split the incident light in different polarization directions. With this structure, the polarization angle may be easily calculated.

According to a preferred aspect, it is preferable that the optical encoder unit further includes: a cylindrical cover; and a shaft that is capable of freely rotating by being supported by a bearing attached inside the cover, and the cover encloses the optical scale attached to the shaft, the light source, and the optical sensor unit. With this structure, external light noise may be suppressed inside the cover.

According to a preferred aspect, it is preferable that the optical encoder unit further includes: a first bare chip including the first photoreceiver, the second photoreceiver, the third photoreceiver, and the fourth photoreceiver; and an amplifier circuit for amplifying signals of the first photoreceiver, the second photoreceiver, the third photoreceiver, and the fourth photoreceiver, and the first bare chip and the amplifier circuit are fixed at positions so as to overlap each other in a plan view and are electrically connected to each other. With this structure, the optical encoder unit can be miniaturized, and signal noise can be reduced. Additionally, in the case where the amplifier circuit is a second bare chip, the optical encoder unit can be further miniaturized, and signal noise can be reduced.

According to a preferred aspect, it is preferable that the optical encoder unit further includes a bare chip that includes the first photoreceiver, the second photoreceiver, the third photoreceiver, and the fourth photoreceiver, and on which an amplifier circuit for amplifying signals of the first photoreceiver, the second photoreceiver, the third photoreceiver, and the fourth photoreceiver are integrated. With this structure, the optical encoder unit can be miniaturized, and signal noise can be reduced.

According to another aspect of the present invention in order to solve the above-mentioned problems and achieve the first purpose, there is provided an optical encoder including: the optical encoder unit; and computing means for calculating an amount of relative movement between the optical scale and the optical sensor unit from light intensities detected by the first photoreceiver, the second photoreceiver, the third photoreceiver, and the fourth photoreceiver. With this structure, the optical encoder can realize accurate angle measurement with a high resolution.

According to a preferred aspect, it is preferable that the computing means calculates an amount of absolute movement between the optical scale and the optical sensor unit by storing in a storage device, and reading from the storage device at a time of activation, whether a rotation position of the optical scale is in a range equal to or more than zero degrees and less than 180 degrees, or in a range equal to or more than 180 degrees and less the 360 degrees. Accordingly, the encoder may function as an absolute encoder that is capable of calculating the absolute position of a rotor.

The present invention can provide an optical encoder unit and an optical encoder that can reduce the influence of fluctuations in the amount of detected light and ease accurate adjustment of the optical axis.

DETAILED DESCRIPTION OF THE PREFERRED EMBODIMENT

Modes (embodiments) for carrying out the present invention will be described in detail with reference to the drawings. The present invention is not limited by the descriptions of the following embodiments. The elements described hereunder include those that can be easily thought of by those skilled in the art and substantially the same elements. The elements described hereunder may also be combined as appropriate.

(First Embodiment)

Figure 1:
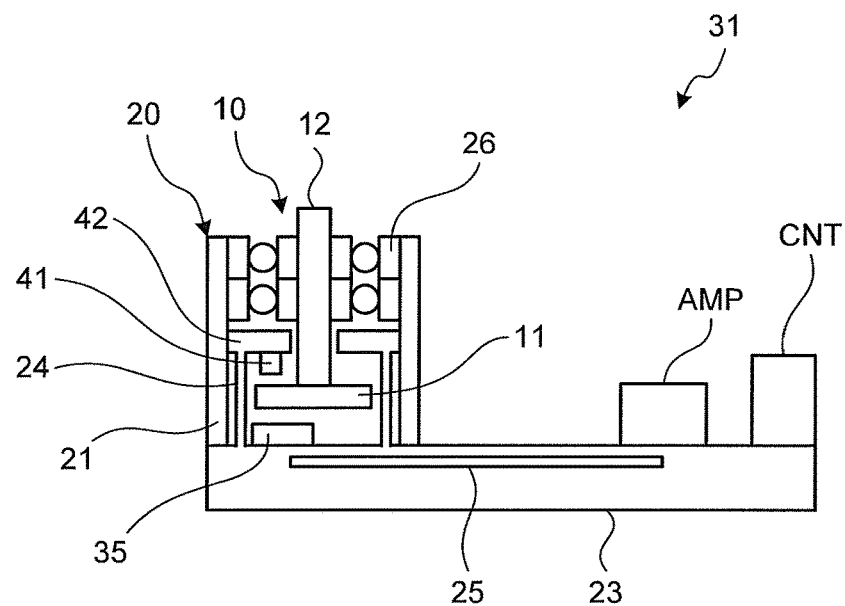
FIG. 1 is a structure diagram of an optical encoder unit according to a first embodiment.
Figure 2:
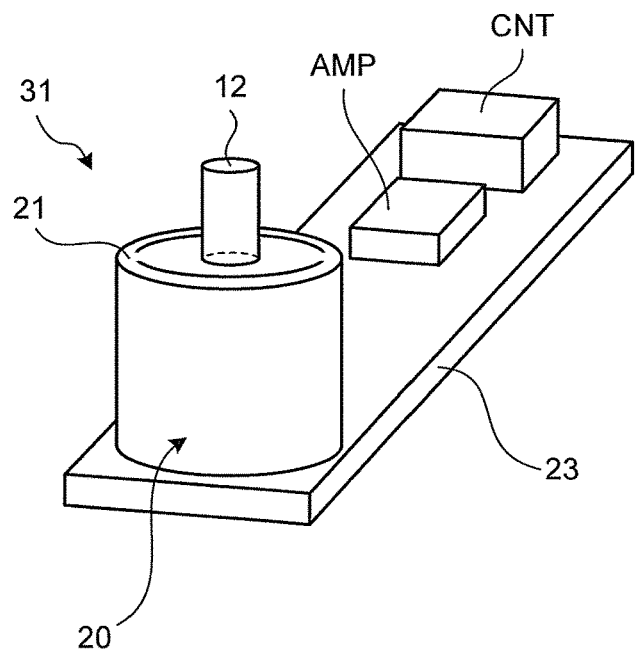
FIG. 2 is a perspective view of an appearance of the optical encoder unit according to the first embodiment.
Figure 3:
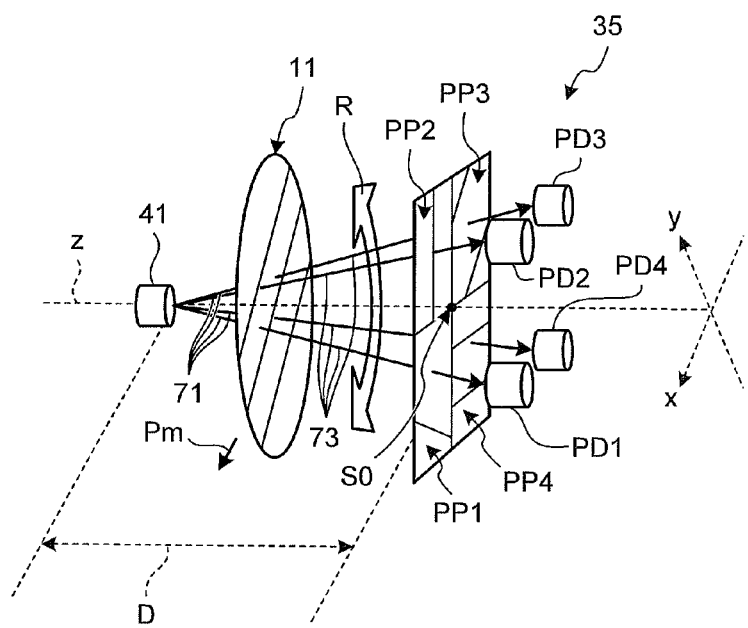
FIG. 3 is an explanatory diagram illustrating an arrangement example of an optical scale and an optical sensor unit.
Figure 4:
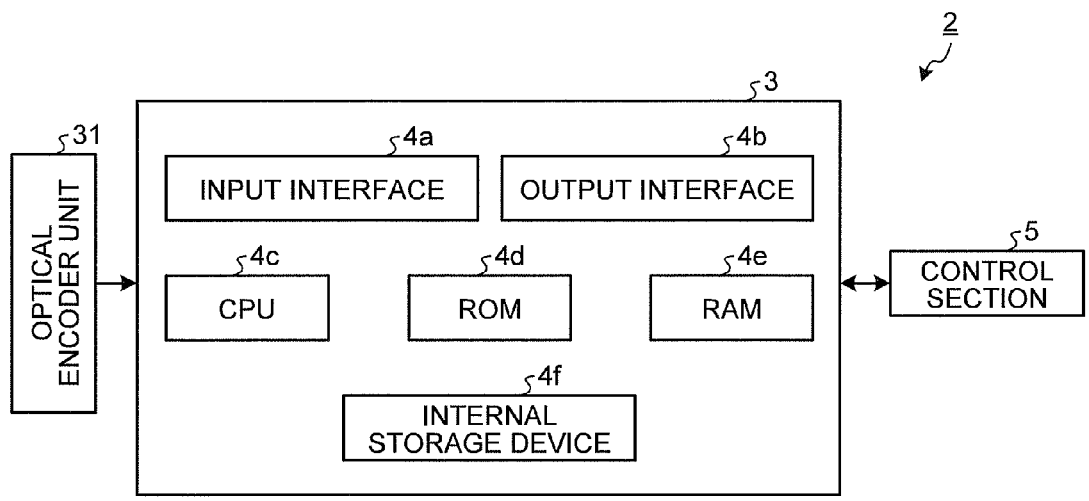
FIG. 4 is a block diagram of an optical encoder according to the first embodiment.
Figure 5:
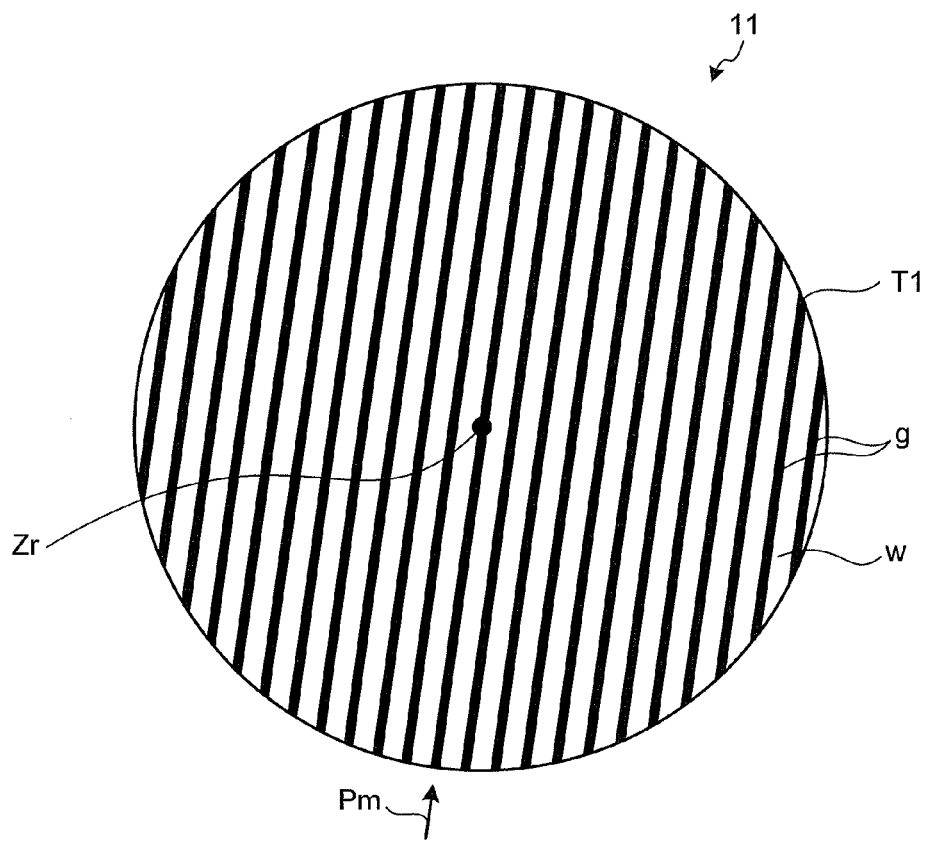
FIG. 5 is an explanatory diagram illustrating an example of an optical scale pattern according to the first embodiment.

FIG. 1 is a structure diagram of an optical encoder unit according to the first embodiment. FIG. 2 is a perspective view of an appearance of the optical encoder unit according to the first embodiment. FIG. 1 is a schematic cross-sectional view of FIG. 2. FIG. 3 is an explanatory diagram illustrating an arrangement example of an optical scale and an optical sensor unit. FIG. 4 is a block diagram of an optical encoder according to the first embodiment. FIG. 5 is an explanatory diagram illustrating an example of an optical scale pattern according to the first embodiment. An optical encoder unit 31 includes a rotor 10 having a shaft 12 coupled with a rotary machine such as a motor, a stator 20, and an optical sensor unit 35 which is capable of reading a signal pattern.

As illustrated in FIG. 1, the rotor 10 includes an optical scale 11 which is a circular member as illustrated in FIG. 5, or a polygonal member. The optical scale 11 is made of silicon, glass, or a polymer material, for example. The optical scale 11 may be annular or hollow. The optical scale 11 illustrated in FIG. 5 has signal tracks T1 on one surface. Further, in the rotor 10, the shaft 12 is attached to a surface opposite to the surface on which the signal tracks T1 are provided. Even if the optical scale 11 is inclined, when the inclination angle is small, the polarization/splitting function is not affected. That is, the optical scale 11 functions as a polarization/splitting element even if it is inclined with respect to a plane orthogonal to a rotation center Zr.

As illustrated in FIG. 2, the stator 20 includes a cylindrical cover 21, and a substrate 23. The cylindrical cover 21 is fixed independently of the rotor 10 to a surface of the substrate 23, and the rotor 10 is capable of relatively rotating with respect to the stator 20. The cover 21 is made of a light-shielding member enclosing a bearing 26, the shaft 12, the optical scale 11 attached at an end of the shaft 12, and the optical sensor unit 35. Accordingly, external optical noise can be suppressed inside the cover 21. The cover 21 supports the shaft 12 in a rotatable manner via the bearing 26. The inner circumference of the cover 21 is fixed to the outer ring of the bearing 26, and the outer circumference of the shaft 12 is fixed to the inner ring of the bearing 26. When the shaft 12 is rotated by the rotation of a rotary machine such as a motor, the optical scale 11 rotates around the rotation center Zr as the axial center, in association with the shaft 12. The optical sensor unit 35 is fixed to the substrate 23. When the rotor 10 is rotated, the signal tracks T1 of the optical scale 11 move relatively to the optical sensor unit 35.

As illustrated in FIGS. 1 and 2, the optical encoder unit 31 includes a connector CNT that is an input/output terminal and a preamplifier AMP that is an amplifier, both elements being fixed on the substrate 23. In the optical encoder unit 31 according to the first embodiment, a light source 41 is fixed to a surface of a light source substrate 42. A conductive line 25 provided on a surface of or the inside of the substrate 23 and a line 24 provided along the inside of the cover 21 connect the connector CNT, the preamplifier AMP, the optical sensor unit 35, and the light source 41 with one another as appropriate.

As illustrated in FIG. 3, when the shaft 12 of the rotor 10 described above is rotated, the optical scale 11 moves in an R direction relatively to the optical sensor unit 35, for example. The optical scale 11 is configured such that a polarization direction Pm of a polarizer on the plane is along a predetermined direction, and the polarization direction Pm is changed according to rotation. The optical sensor unit 35 can receive incident light (transmissive light) 73, which is light source light 71 of the light source 41 transmitted and entering through the optical scale 11, and read the signal tracks T1 of the optical scale 11 illustrated in FIG. 5.

The optical encoder unit 31 according to the first embodiment is not limited to the above-described structure where the transmissive optical scale and optical sensor are arranged, but may be configured such that a reflective optical scale and optical sensor unit are arranged as will be described in a following embodiment. The light source 41 is a light-emitting diode or a semiconductor laser light source, for example, and details thereof will be described below.

An optical encoder 2 includes the optical encoder unit 31 described above, and a calculation processing device 3. As illustrated in FIG. 4, the optical encoder unit 31 and the calculation processing device 3 are connected with each other. The calculation processing device 3 is connected to a control unit 5 of a rotary machine such as a motor, for example.

The optical encoder 2 detects, by the optical sensor unit 35, the incident light 73, which is the light source light 71 made incident on the optical sensor unit 35 by passing through or being reflected by the optical scale 11. The calculation processing device 3 calculates, from a detection signal of the optical sensor unit 35, the relative positions of the rotor 10 and the optical sensor unit 35 of the optical encoder unit 31, and outputs, as a control signal, information about the relative positions to the control unit 5 of a rotary machine such as a motor.

The calculation processing device 3 is a computer such as a personal computer (PC), and includes an input interface 4a, an output interface 4b, a CPU (Central Processing Unit) 4c, a ROM (Read Only Memory) 4d, a RAM (Random Access Memory) 4e, and an internal storage device 4f. The input interface 4a, the output interface 4b, the CPU 4c, the ROM 4d, the RAM 4e, and the internal storage device 4f are connected with one another by an internal bus. The calculation processing device 3 may be configured as a dedicated processing circuit.

The input interface 4a receives an input signal from the optical sensor unit 35 of the optical encoder unit 31, and outputs the signal to the CPU 4c. The output interface 4b receives a control signal from the CPU 4c, and outputs the signal to the control unit 5.

The ROM 4d stores programs such as BIOS (Basic Input Output System) and the like. The internal storage device 4f is an HDD (Hard Disk Drive) or a flash memory, for example, and stores an operating system program and application programs. The CPU 4c realizes various functions by executing the programs stored in the ROM 4d or the internal storage device 4f while using the RAM 4e as a work area.

The internal storage device 4f serving as storage means stores a database in which a polarization axis, described below, of the optical scale 11 and an output terminal of a sensor of the optical sensor unit 35 are associated with each other. The internal storage device 4f stores a database in which values of a parameter azimuth $\varphi$ and an inclination angle (zenith angle) $\theta$, described below, and positional information of the optical scale 11 are associated with each other. Furthermore, the internal storage device 4f stores a database in which the value of a distance D, described below, and positional information of the optical scale 11 are associated with each other.

The signal tracks T1 illustrated in FIG. 5 are formed such that fine metal wires (wires) g are arranged on the optical scale 11 illustrated in FIG. 1, which is referred to as a wire grid pattern. Adjacent fine metal wires g are linearly arranged in parallel to each other on the optical scale 11, as the signal tracks T1. Accordingly, the polarization axis of the optical scale 11 is the same regardless of a position at which the optical scale 11 is irradiated with the light source light 71, and the polarization direction of the polarizer on the plane is along one direction.

Furthermore, the optical scale 11 having the fine metal wires g called a wire grid pattern can have a higher heat resistance than a photo-induced polarization plate. Moreover, the optical scale 11 has a line pattern with no intersection even locally, and thus a highly accurate optical scale with less error can be achieved. Moreover, the optical scale 11 can be stably manufactured through a bulk-exposure or nanoimprinting, and highly accurate optical scales with less error may be achieved. Further, the optical scale 11 may be a photo-induced polarization plate.

A plurality of fine metal wires g are arranged without intersecting with one another. A transmissive area w allowing all or a part of the light source light 71 to pass through is provided between the adjacent fine metal wires g. When the width of the fine metal wire g and the pitch between the fine metal wires g, i.e., the width of the fine metal wire g and the width of the transmissive area w, are made sufficiently smaller than the wavelength of the light source light 71 from the light source 41, the optical scale 11 can polarize and split the incident light 73 of the light source light 71. Accordingly, the optical scale 11 has a polarizer whose polarization axis Pm on the plane is uniform. The optical scale 11 is configured such that the polarization axis of the incident light that is incident on the optical sensor unit 35 changes in the rotating circumferential direction, according to the rotation of the optical scale 11. In the first embodiment, the change in the polarization axis is such that an increase and a decrease are repeated twice for one rotation of the optical scale 11.

The optical scale 11 does not need to have fine segments with different polarization directions. The optical scale 11 has a uniform polarization axis Pm, and thus there is no border between areas with different polarization axes Pm, and disturbance of the polarization state of the incident light 73 by such a border may be suppressed. The optical encoder 2 of the first embodiment is capable of reducing a possibility of erroneous detection or occurrence of noise.

Figure 6:
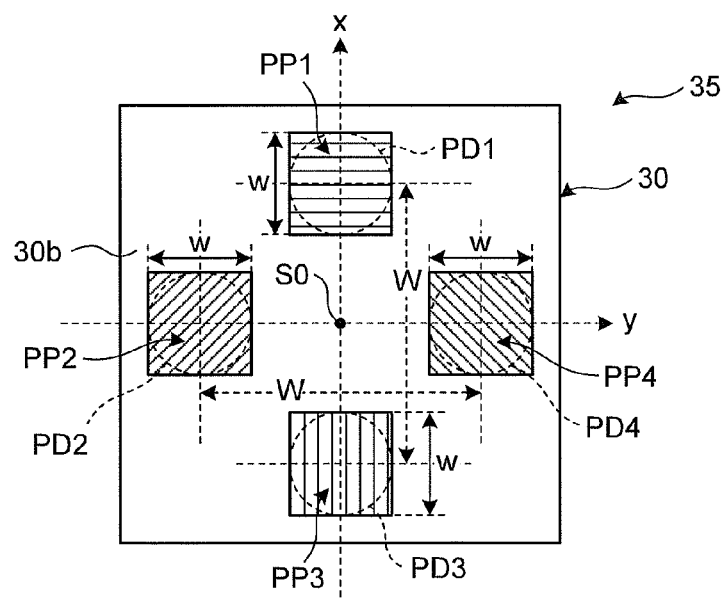
FIG. 6 is an explanatory diagram illustrating an example of an optical sensor unit according to the first embodiment.
Figure 7:
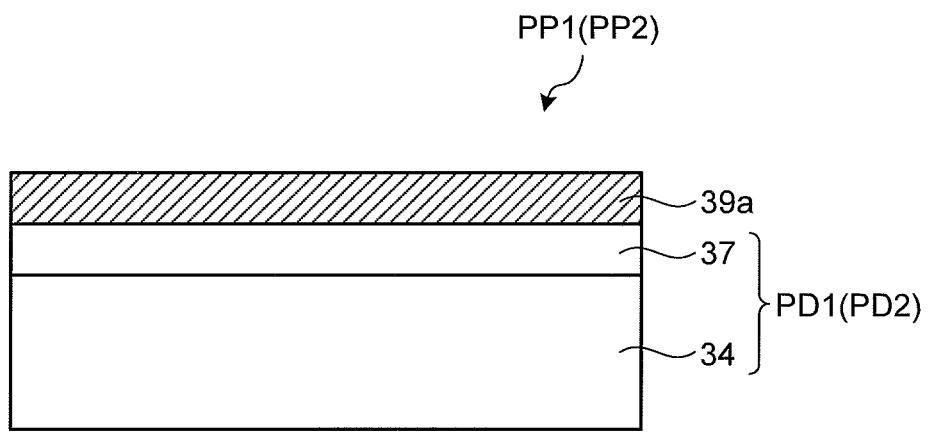
FIG. 7 is an explanatory diagram illustrating an example of a first photoreceiver of an optical sensor according to the first embodiment.
Figure 8:
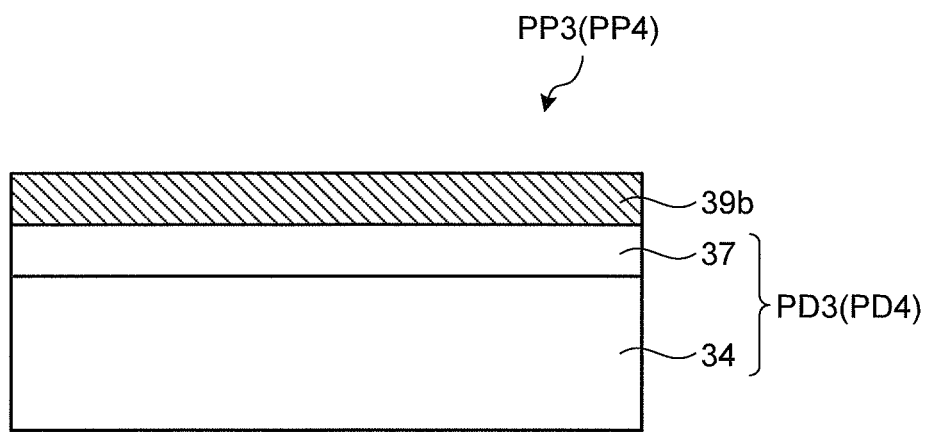
FIG. 8 is an explanatory diagram illustrating an example of a third photoreceiver of the optical sensor according to the first embodiment.

FIG. 6 is an explanatory diagram illustrating an example of an optical sensor unit according to the first embodiment. FIG. 7 is an explanatory diagram illustrating an example of a first photoreceiver of an optical sensor according to the first embodiment. FIG. 8 is an explanatory diagram illustrating an example of a third photoreceiver of the optical sensor according to the first embodiment. As illustrated in FIGS. 3 and 6, the optical sensor unit 35 includes, on a surface 30b of a unit base member 30, a first photoreceiver PD1 having a polarizing layer PP1, a second photoreceiver PD2 having a polarizing layer PP2, a third photoreceiver PD3 having a polarizing layer PP3, and a fourth photoreceiver PD4 having a polarizing layer PP4. As illustrated in FIG. 6, in plan view, the first photoreceiver PD1, the second photoreceiver PD2, the third photoreceiver PD3, and the fourth photoreceiver PD4 are arranged at an equal distance from an arrangement center S0 on the surface 30b of the unit base member 30.

As illustrated in FIG. 3, the light source light 71 radiated from the light source 41 passes through the optical scale 11 described above, and passes through the polarizing layer PP1, the polarizing layer PP2, the polarizing layer PP3, and the polarizing layer PP4 as the incident light 73, and becomes incident on the first photoreceiver PD1, the second photoreceiver PD2, the third photoreceiver PD3, and the fourth photoreceiver PD4.

As illustrated in FIG. 3, the distance is preferably equal between the arrangement center S0 and each of the first photoreceiver PD1, the second photoreceiver PD2, the third photoreceiver PD3, and the fourth photoreceiver PD4. This structure can reduce the calculation load of the CPU 4c serving as computing means.

Furthermore, the first photoreceiver PD1 is arranged at a position that is point-symmetrical to the third photoreceiver PD3 about the arrangement center S0, and the second photoreceiver PD2 is arranged at a position that is point-symmetrical to the fourth photoreceiver PD4 about the arrangement center S0. The first photoreceiver PD1 is arranged away from the third photoreceiver PD3 by a distance W across the arrangement center S0, and the second photoreceiver PD2 is arranged away from the fourth photoreceiver PD4 by the distance W across the arrangement center S0. The first photoreceiver PD1, the third photoreceiver PD3, the second photoreceiver PD2, and the fourth photoreceiver PD4 have a width w, and there is a limitation that the distance W is not smaller than a width 2w. In the first embodiment, a virtual axis, on the surface 30b of the unit base member 30, passing through the first photoreceiver PD1, the arrangement center S0, and the third photoreceiver PD3 is given as an x-axis, and a virtual axis, on the surface 30b of the unit base member 30, passing through the second photoreceiver PD2, the arrangement center S0, and the fourth photoreceiver PD4 is given as a y-axis. In FIG. 6, the x-axis is orthogonal to the y-axis on the surface of the unit base member 30. As illustrated in FIG. 3, the distance between an emitting surface of the light source 41 and the arrangement center S0 is given as D. An xy plane formed by the x-axis and the y-axis is orthogonal to a z-axis connecting the emitting surface of the light source 41 and the arrangement center S0.

As illustrated in FIG. 3, when seen in plan view from the z-axis direction, the first photoreceiver PD1, the second photoreceiver PD2, the third photoreceiver PD3, and the fourth photoreceiver PD4 are arranged around the light source 41. The distance is preferably equal between the arrangement center S0 and each of the first photoreceiver PD1, the second photoreceiver PD2, the third photoreceiver PD3, and the fourth photoreceiver PD4. This structure reduces the calculation load of the CPU 4c serving as computing means.

As illustrated in FIG. 7, the first photoreceiver PD1 includes a silicon substrate 34, a photoreceiver 37, and a first polarizing layer 39a. Further, as illustrated in FIG. 8, the third photoreceiver PD3 includes a silicon substrate 34, a photoreceiver 37, and a second polarizing layer 39b. For example, the silicon substrate 34 is an n-type semiconductor, and the photoreceiver 37 is a p-type semiconductor, and a photodiode may be formed by the silicon substrate 34 and the photoreceiver 37 by a PN junction. The first polarizing layer 39a and the second polarizing layer 39b may be formed by a photo-induced polarizing layer, a wire grid pattern having fine metal wires that are arranged in parallel to one another, or the like. The first polarizing layer 39a splits the incident light 73 entering the optical scale 11, illustrated in FIG. 3, from the light source light 71 in a first polarization direction, and the second polarizing layer 39b splits the incident light in a second polarization direction. The polarization axis of first split light and the polarization axis of second split light are preferably different from each other by 90 degrees. According to this structure, the CPU 4c of the calculation processing device 3 can easily calculate the polarization angle.

The following describes the second photoreceiver PD2 and the fourth photoreceiver PD4 similarly to the above with reference to FIGS. 7 and 8. The second photoreceiver PD2 includes a silicon substrate 34, a photoreceiver 37, and a first polarizing layer 39a. Further, as illustrated in FIG. 8, the fourth photoreceiver PD4 includes a silicon substrate 34, a photoreceiver 37, and a second polarizing layer 39b. For example, the silicon substrate 34 is an n-type semiconductor, and the photoreceiver 37 is a p-type semiconductor, and a photodiode may be formed by the silicon substrate 34 and the photoreceiver 37 by a PN junction. The first polarizing layer 39a and the second polarizing layer 39b may be formed by a photo-induced polarizing layer, a wire grid pattern having fine metal wires that are arranged in parallel to one another, or the like. The first polarizing layer 39a splits the incident light 73 entering the optical scale 11, illustrated in FIG. 3, from the light source light 71 in a first polarization direction, and the second polarizing layer 39b splits the incident light in a second polarization direction. The polarization axis of first split light and the polarization axis of second split light are preferably different from each other by 90 degrees. According to this structure, the CPU 4c of the calculation processing device 3 can easily calculate the polarization angle.

The first photoreceiver PD1, the second photoreceiver PD2, the third photoreceiver PD3, and the fourth photoreceiver PD4 receive light via the polarizing layers PP1, PP2, PP3, and PP4 which split the incident light 73 in different polarization directions. Accordingly, the polarization axis in the case of splitting by the polarizing layer PP1 and the polarization axis in the case of splitting by the polarizing layer PP2 are preferably different from each other by 45 degrees. The polarization axis in the case of splitting by the polarizing layer PP2 and the polarization axis in the case of splitting by the polarizing layer PP3 are preferably different from each other by 45 degrees. The polarization axis in the case of splitting by the polarizing layer PP3 and the polarization axis in the case of splitting by the polarizing layer PP4 are preferably different from each other by 45 degrees. The polarization axis in the case of splitting by the polarizing layer PP4 and the polarization axis in the case of splitting by the polarizing layer PP1 are preferably different from each other by 45 degrees. According to this structure, the CPU 4c of the calculation processing device 3 can easily calculate the polarization angle.

Figure 9:
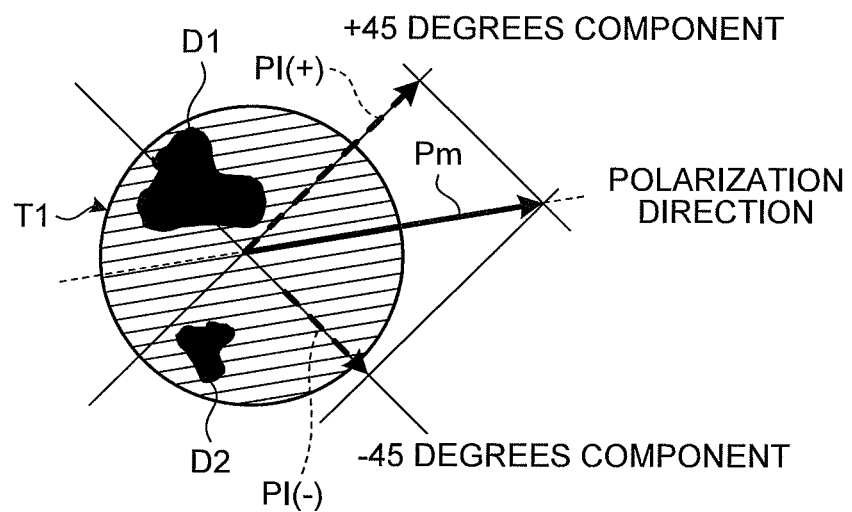
FIG. 9 is an explanatory diagram illustrating splitting of polarized components by the optical sensor according to the first embodiment.
Figure 10:
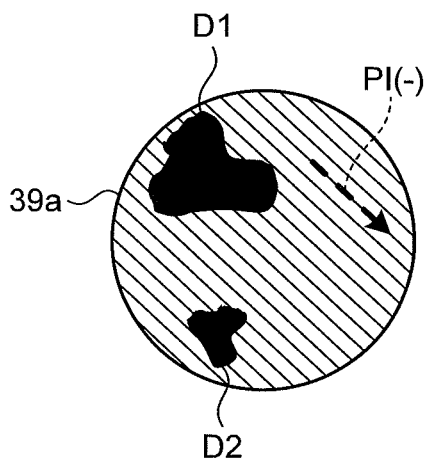
FIG. 10 is an explanatory diagram illustrating splitting of polarized components by the optical sensor according to the first embodiment.
Figure 11:
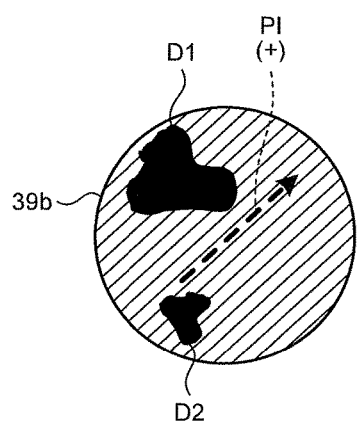
FIG. 11 is an explanatory diagram illustrating splitting of polarized components by the optical sensor according to the first embodiment.

FIGS. 9, 10, and 11 are explanatory diagrams for illustrating splitting of polarized components by an angle sensor according to the first embodiment. As illustrated in FIG. 9, light polarized in the polarization direction Pm by the signal tracks T1 of the optical scale 11 is made incident on the optical sensor unit 35. In FIG. 9, a foreign substance D1 and a foreign substance D2 exist in a sensing area. The polarization direction Pm of the incident light may be expressed by using a light intensity PI(−) of a component in the first polarization direction and a light intensity PI(+) of a component in the second polarization direction. As described above, the first polarization direction and the second polarization direction are preferably different from each other by 90 degrees, which is exemplified as a +45 degrees component and a −45 degrees component with respect to a reference direction. In FIGS. 9, 10, and 11, the axial direction of the wire grid is illustrated to be in parallel to the surface of the respective papers in which FIGS. 9 to 11 are drawn. However, even if the axial direction of the wire grid is inclined at the same angle with respect to the surface of the respective papers, when the inclination angle is small, there is no influence on the polarization/splitting function. That is, the optical scale 11 functions as a polarization/splitting element even when inclined with respect to the rotation axis.

As illustrated in FIG. 10, because detection is performed through the first polarizing layer 39a that splits the incident light in the first polarization direction, the first photoreceiver PD1 detects a light intensity PI(−) of a component in the first polarization direction. As illustrated in FIG. 11, because detection is performed through the second polarizing layer 39b that splits the incident light in the second polarization direction, the third photoreceiver PD3 detects a light intensity PI(+) of a component in the second polarization direction. In the same manner, as illustrated in FIG. 10, because detection is performed through the first polarizing layer 39a that splits the incident light in the first polarization direction, the second photoreceiver PD2 detects a light intensity PI(−) of a component in the first polarization direction. As illustrated in FIG. 11, because detection is performed through the second polarizing layer 39b that splits the incident light in the second polarization direction, the fourth photoreceiver PD4 detects a light intensity PI(+) of a component in the second polarization direction.

Figure 12:
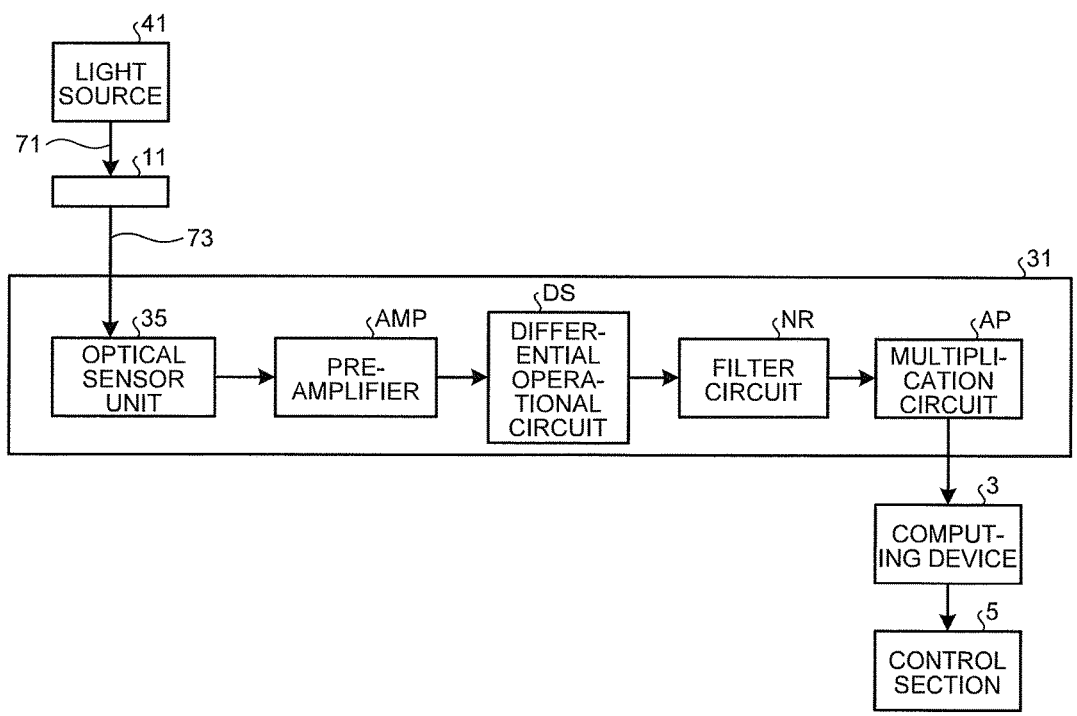
FIG. 12 is a functional block diagram of the optical encoder according to the first embodiment.
Figure 13:
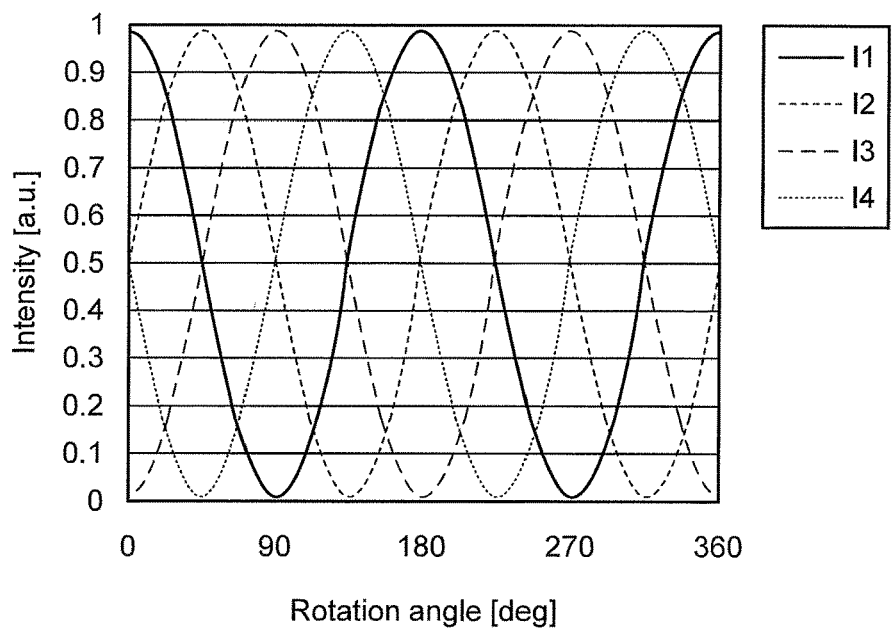
FIG. 13 is an explanatory diagram illustrating a rotation angle of the optical scale and a change in the light intensity of the polarized component of each photoreceiver according to the first embodiment.

FIG. 12 is a functional block diagram of the optical encoder according to the first embodiment. FIG. 13 is an explanatory diagram illustrating a rotation angle of the optical scale and a change in the light intensity of the polarized component of each photoreceiver according to the first embodiment. As illustrated in FIG. 12, the light source 41 emits light based on a reference signal, and irradiates the optical scale 11 with the light source light 71. The incident light 73 which is transmissive light (this may also be incident light 72, described below, which is reflected light) is received by the optical sensor unit 35, which is a photoreceiver. As illustrated in FIG. 12, a differential operational circuit DS performs a differential operational process according to a received light signal amplified by the preamplifier AMP.

The differential operational circuit DS acquires the light intensity PI(−) of a component in the first polarization direction (first split light) and the light intensity PI(+) of a component in the second polarization direction (second split light), which are detection signals of the optical sensor unit 35. The respective outputs of the first photoreceiver PD1, the second photoreceiver PD2, the third photoreceiver PD3, and the fourth photoreceiver PD4 corresponding to the light intensity PI(−) or the light intensity PI(+) are light intensities I1, I2, I3, and I4 whose phases are shifted according to rotation of the optical scale 11, as illustrated in FIG. 13, for example.

The differential operational circuit DS calculates differential signals Vc and Vs that are dependent on the rotation of optical scale 11, from the light intensity PI(−) of the component in the first polarization direction and the light intensity PI(+) of the component in the second polarization direction and according to Equations (1) and (2).

$$Vc = (I1-I3)/(I1-I3) \tag{1}$$

$$Vs = (I2-I4)/(I2+I4) \tag{2}$$

In this manner, the differential operational circuit DS calculates a sum of light intensities [I1+I3] and a difference between the light intensities [I1−I3] based on the light intensity I1 and the light intensity I3, and calculates a differential signal Vc by dividing the difference between the light intensities [I1−I3] by the sum of the light intensities

[I1+I3]. Further, the differential operational circuit DS calculates a sum of light intensities [I2+I4] and a difference between the light intensities [I2−I4] based on the light intensity I2 and the light intensity I4, and calculates a differential signal Vs by dividing the difference between the light intensities [I2−I4] by the sum of the light intensities [I2+I4]. The differential signals Vc and Vs calculated by Equations (1) and (2) do not include parameters that are affected by the light intensity of the light source light 71, and thus the influence on the output of the optical encoder unit 31 by the distance between the optical sensor unit 35 and the optical scale 11 and fluctuation in the light intensity of the light source 41, and the like can be reduced. Moreover, as indicated by Equation (1), the differential signal Vc is a function for a rotation angle β of the polarization axis (hereinafter referred to as a polarization angle) of the optical scale 11, which is the rotation angle of the optical scale 11. However, the division mentioned above is not necessary in the case where an auto power control (APC) for controlling the light amount of the light source to be constant is provided.

Figure 14:
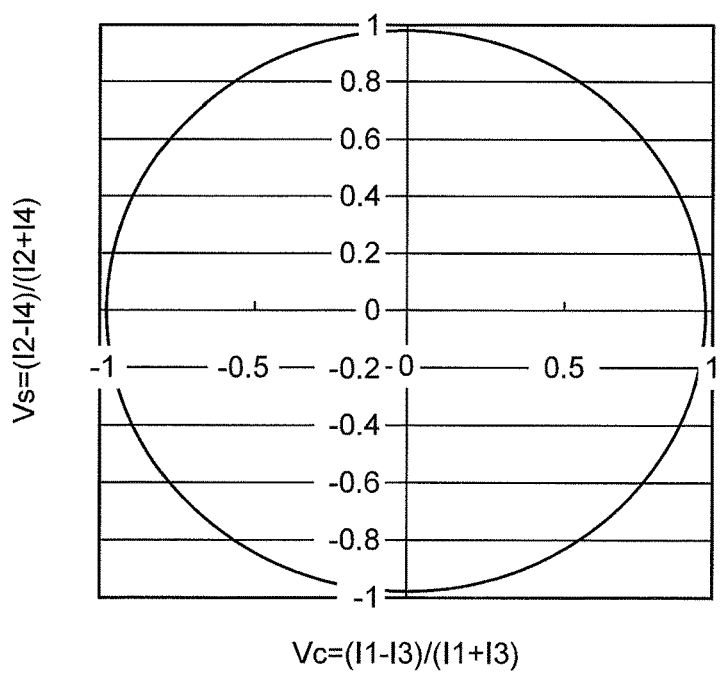
FIG. 14 is an explanatory diagram illustrating a relationship between a rotation angle and a Lissajous angle of the optical scale according to the first embodiment.

As illustrated in FIG. 12, the differential signals Vc and Vs are input to a filter circuit NR, and noise is removed. Next, a Lissajous pattern illustrated in FIG. 14 is calculated by a multiplication circuit AP from the differential signals Vc and Vs, and an absolute angle of the rotation angle of the rotor 10 rotated from the initial position can be identified. The differential signals Vc and Vs are differential signals whose phases are shifted by λ/4, and a Lissajous angle is determined by calculating a Lissajous pattern that takes a cosine curve of the differential signal Vc as the horizontal axis and a sine curve of the differential signal Vs as the vertical axis, and according to the rotation angle. For example, the Lissajous pattern illustrated in FIG. 14 is cycled twice as the rotor 10 is rotated once. The calculation processing device 3 has a function of storing whether the rotation position of the optical scale 11 is in a range of equal to or more than zero degrees and less than 180 degrees, or in a range of equal to or more than 180 degrees and less than 360 degrees. With this structure, the optical encoder 2 may function as an absolute encoder that is capable of calculating the absolute position of the rotor 10. Other than the structure illustrated in FIG. 12, the optical encoder unit 31 may be configured so as to further include the optical sensor unit 35 and the preamplifier AMP.

Figure 15:
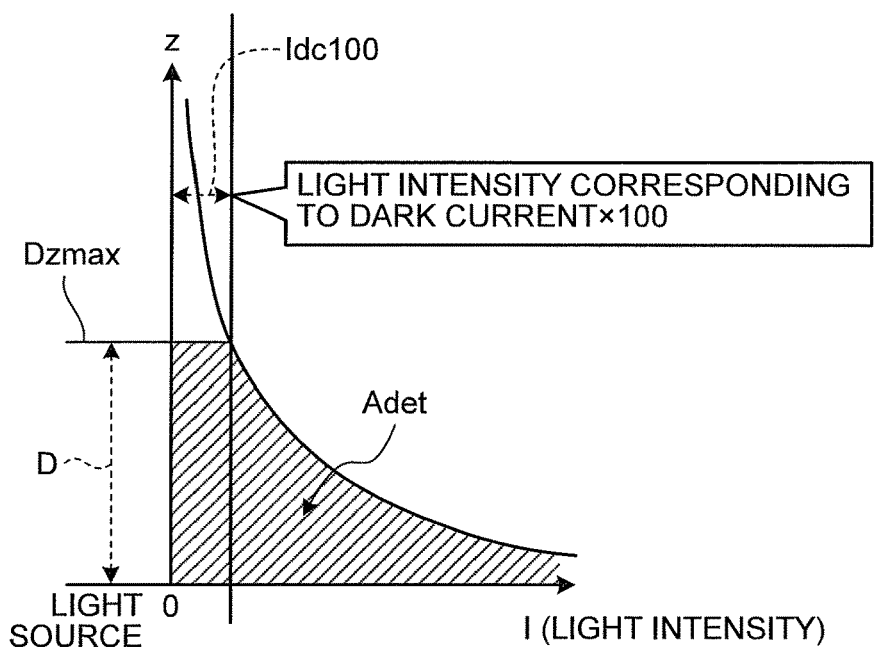
FIG. 15 is an explanatory diagram illustrating a position at which a light intensity that is predetermined times greater or more than that corresponding to dark current of the optical sensor according to the first embodiment can be received.
Figure 16:
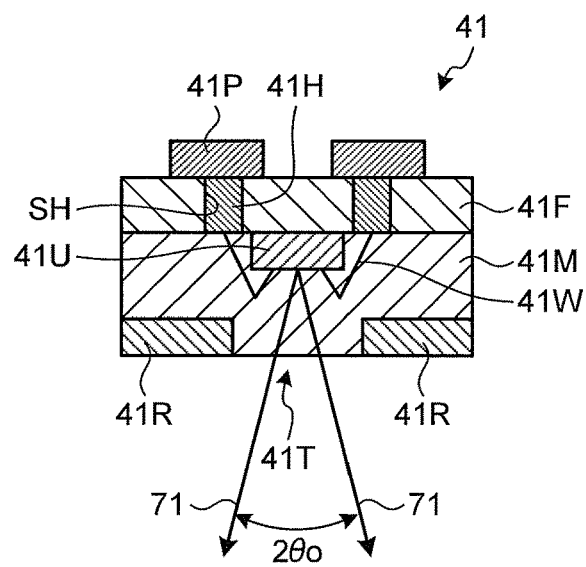
FIG. 16 is a plan view illustrating a light source according to the first embodiment.
Figure 17:
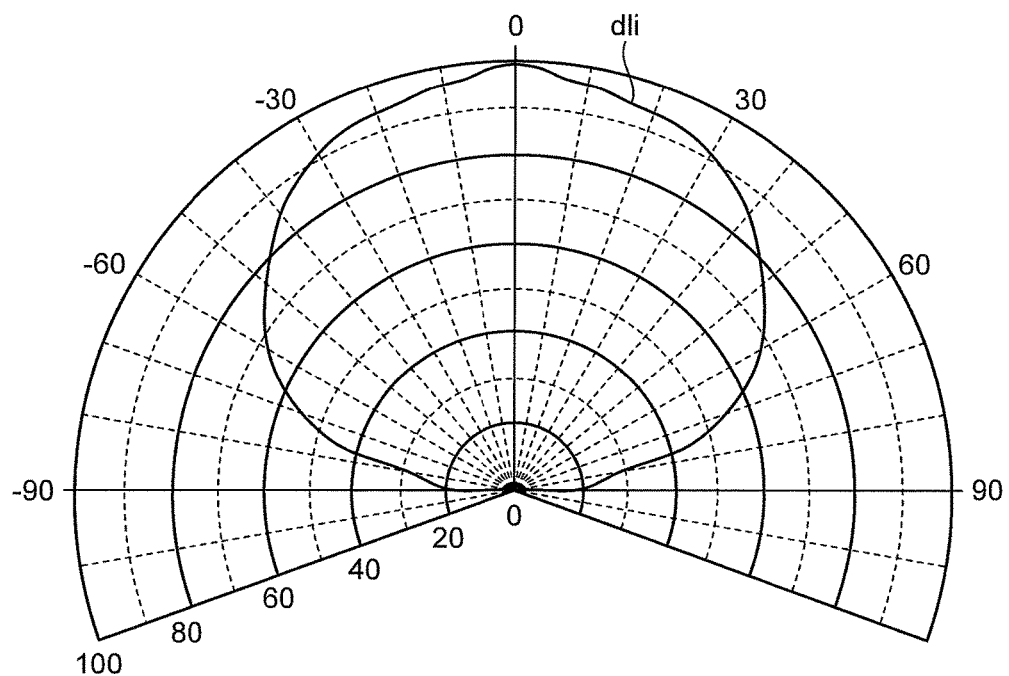
FIG. 17 is an explanatory diagram illustrating an example of measurement of a light distribution of the light source according to the first embodiment in the form of a circular graph.
Figure 18:
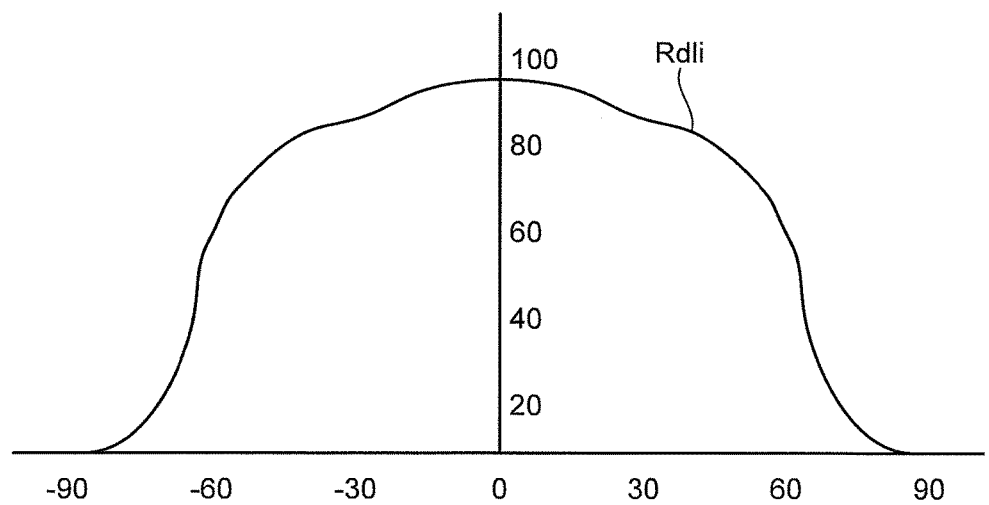
FIG. 18 is an explanatory diagram illustrating an example of the light distribution of the light source obtained by converting the circular graph in FIG. 17 into rectangular coordinates of an angle and a light intensity.
Figure 19:
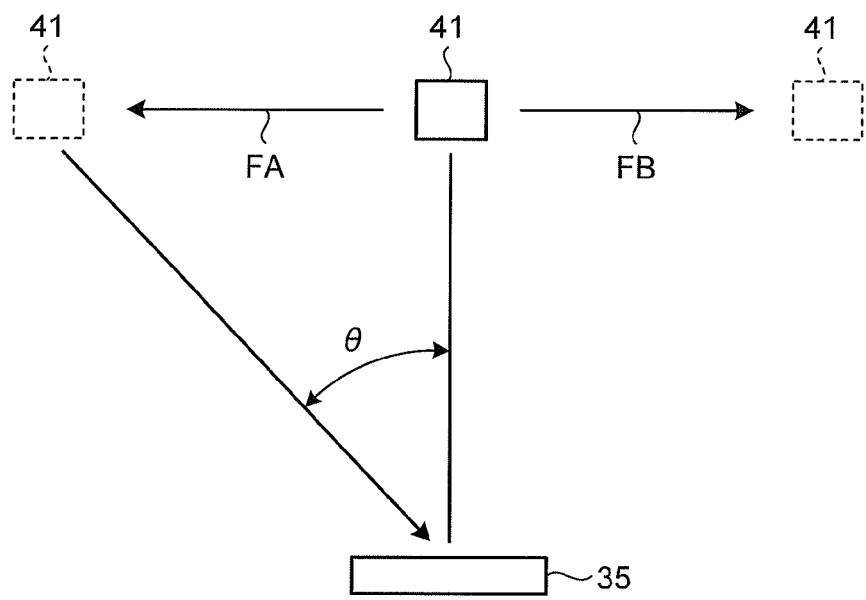
FIG. 19 is an explanatory diagram illustrating influence of a shift in the positions of the light source and the optical sensor unit on the light distribution of the light source.

FIG. 15 is an explanatory diagram illustrating a position at which a light intensity that is predetermined times greater or more than that corresponding to dark current of the optical sensor according to the first embodiment can be received. The vertical axis in FIG. 15 indicates the distance from the light source on the z-axis, and the light intensity is given as I on the horizontal axis in FIG. 15. FIG. 16 is a plan view illustrating the light source according to the first embodiment. FIG. 17 is an explanatory diagram illustrating an example of measurement of a light distribution of the light source according to the first embodiment in the form of a circular graph. FIG. 18 is an explanatory diagram illustrating an example of the light distribution of the light source obtained by converting the circular graph in FIG. 17 into rectangular coordinates of an angle and a light intensity. FIG. 19 is an explanatory diagram illustrating influence of a shift in the positions of the light source and the optical sensor unit on the light distribution of the light source. In the case of emission through a lens, the light source 41 can radiate parallel light source light, and the optical axis can be easily adjusted. On the other hand, in the case of the light source 41 without a lens, it is inexpensive, but the SN ratio tends to be low because it uses scattered light. It has been found by the inventor(s) of the present application that the SN ratio is dependent on the dark current of the optical encoder unit 31 that is not receiving light and the light distribution of the light source 41. Accordingly, as illustrated in FIG. 15, when the distance between the emitting surface of the light source 41 and the arrangement center S0 (the optical sensor unit 35) is given as D, it has been found that the SN ratio is deteriorated when the distance D between the light source 41 and the optical sensor unit 35 is greater than a distance Dzmax and the optical sensor unit 35 does not receive a light intensity Idc100 which is 100 times greater or more than a light intensity corresponding to the dark current of the optical encoder unit 31. Accordingly, in the case where the light source 41 and the optical sensor unit 35 are arranged at positions with the distance D therebetween that is equal to or less than the distance Dzmax, the light source 41 and the optical sensor unit 35 are close to each other, and the SN ratio is improved. Furthermore, the optical encoder unit 31 is allowed to function, within a detectable range Adet in FIG. 15, even with the light source 41 as illustrated in FIG. 16. As a result, the required accurate adjustment of the optical axis may be eased by the positional relationship between the light source 41 and the optical sensor unit 35. More preferably, the light source 41 and the optical sensor unit 35 are arranged at positions with the distance D therebetween such that the optical encoder 31 can receive light of a light intensity that is 1000 times or more than the light intensity corresponding to the dark current of the optical encoder unit 31 that is not receiving light. In this case, the detectable range Adet is narrowed, but the SN ratio of the output of the optical sensor unit 35 is improved. Here, the light source 41 illustrated in FIG. 16 is a package of a light emitting device 41U such as a light-emitting diode, a laser light source such as a vertical-cavity surface-emitting laser, or a filament. In the light emitting device 41U, a surface-emitting light source is used.

The light source 41 includes a base substrate 41F, penetrating conductive layers 41H embedded in through holes SH, external electrodes 41P that are electrically connected to the penetrating conductive layers 41H, the light emitting device 41U mounted on the base substrate 41F, bonding wires 41W connecting the light emitting device 41U and the penetrating conductive layers 41H in a conducted manner, a sealing resin 41M protecting the light emitting device 41U, and a light-shielding film 41R.

The light-shielding film 41R of the light source 41 functions as a diaphragm to narrow the light source light 71 radiated by the light emitting device 41U into a range of an emitting surface 41T. The emitting surface 41T has no lens surface and is a flat surface. A bare chip of a light-emitting diode (LED) may be used for such a light source 41.

The light distribution, which is the distribution of light intensities in respective directions in which the light source 41 radiates light, can be measured by a light distribution measurement device such as a goniophotometer. The light distribution measurement device measures the intensity of light by a photoreceiver rotating on the circumference or the spherical surface around the light source 41 with its light receiving surface facing the center where the light source 41 is positioned. With this structure, the light distribution measurement device can store a circular graph which indicates information of a light intensity dli for each angle in the circumferential direction around the light source 41, as illustrated in FIG. 17.

When expanded into a rectangular coordinate system in which the horizontal axis represents the angle in the circumferential direction of the circular graph and the vertical axis represents the light intensity of the circular graph (length of the radius), the circular graph illustrated in FIG. 17 becomes a bell-shaped light distribution Rdli illustrated in FIG. 18. The circular graph illustrated in FIG. 17 indicates a ratio of light intensities at each angle in the circumferential direction, assuming a light intensity (length of the radius) at an angle where the intensity of light is the greatest is 100.

Figure 20:
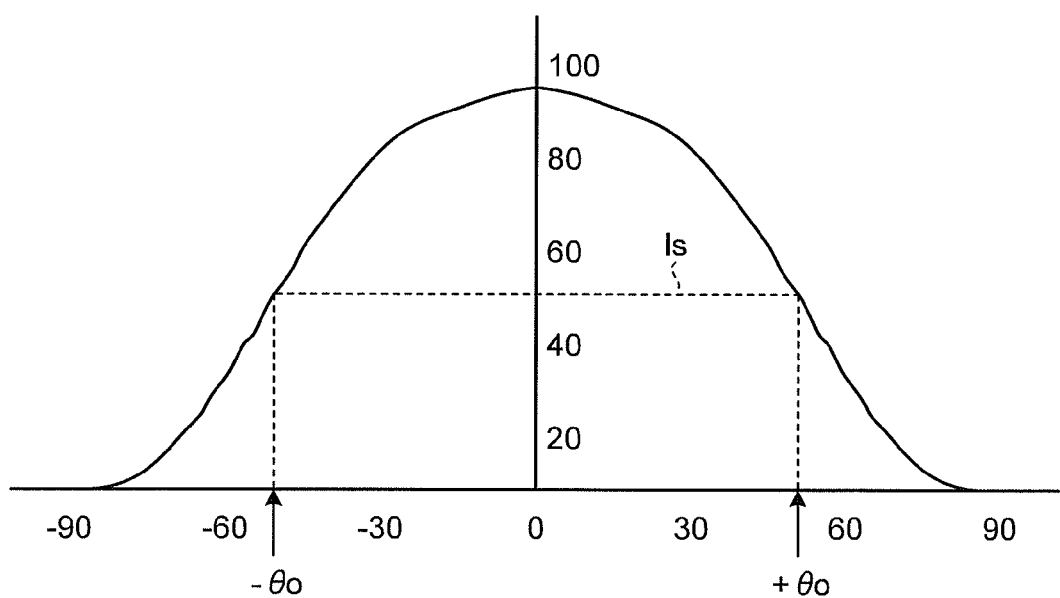
FIG. 20 is an explanatory diagram illustrating an example of a light distribution obtained by correcting the light distribution in FIG. 18 by the shift in the positions of the light source and the optical sensor unit.

Here, as illustrated in FIG. 3, the positional relationship between the light source 41 and the optical sensor unit 35 is preferably such that the optical axis is adjusted to coincide with the z-axis, which is parallel to the rotation center Zr. However, for example, the positions of the light source 41 and the optical sensor unit 35 may be shifted on the xz plane or on the yz plane at the time of assembly. For example, as illustrated in FIG. 19, if, when seen on the xz plane, the positional relationship between the light source 41 and the optical sensor unit 35 is such that the optical axis is shifted by a positional shift component FA of θ with respect to the z-axis, the light intensity of the light distribution Rdli illustrated in FIG. 18 is reduced to a cos θ component. In the example illustrated in FIG. 19, the positional shift component FA is illustrated as an example, but it is also necessary to consider a positional shift component FB. FIG. 20 is an explanatory diagram illustrating an example of a light distribution obtained by correcting the light distribution in FIG. 18 by the shift in the positions of the light source and the optical sensor unit. The light distribution in FIG. 20 is obtained by re-drawing the light distribution in FIG. 18 which has been corrected by the amount of the shift in the positions illustrated in FIG. 19 as a rectangular coordinate system, in which the horizontal axis represents the angle in the circumferential direction of the circular graph and the vertical axis represents the light intensity of the circular graph (length of the radius). In FIG. 20, an angle $+\theta_o$ and an angle $-\theta_o$ are angles in the circumferential direction indicating a predetermined light intensity Is (for example, 50%). The predetermined light intensity Is is not limited to 50%, and may take other values. When a characteristic of a sensor (photodetector) of the optical sensor unit 35 is drastically changed at a certain light intensity, influence on the measurement accuracy may be suppressed by selecting a value which is a change point as the predetermined light intensity Is. In the following description, a predetermined angle $2\theta_o$ is assumed to be in a range from the angle $-\theta_o$ to the angle $+\theta_o$. The graph of the light distribution illustrated in FIG. 20 is not necessarily horizontally symmetrical with respect to an angle zero, and the angles in the circumferential direction indicating the predetermined light intensity Is (for example, 50%) may be given as an angle $+\theta_1$ and an angle $-\theta_2$, and the predetermined angle $2\theta_o$ may be given in a range from the angle $-\theta_2$ to the angle $+\theta_1$ (the angle $+\theta_1$ and the angle $-\theta_2$ are not illustrated).

Figure 21:
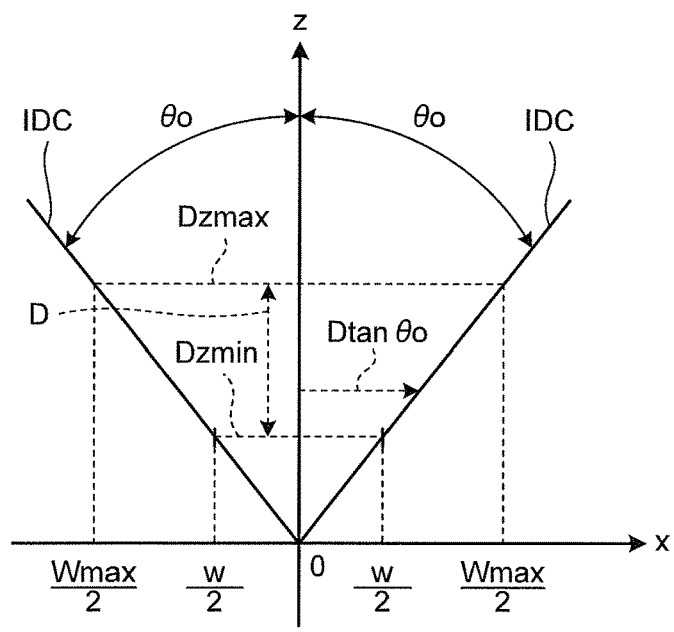
FIG. 21 is an explanatory diagram illustrating a position of a photoreceiver within a range in which the light distribution of the light source of the optical sensor according to the first embodiment is uniform.

The light distribution of the light source light 71 indicates a light distribution at the predetermined angle $2\theta_o$ with respect to a cross section of the emitting surface 41T. FIG. 21 is an explanatory diagram illustrating a position of a photoreceiver within a range in which the light distribution of the light source of the optical sensor according to the first embodiment is uniform. The angles $\pm\theta_o$ described above are projected on the xz plane and a value of the distance D and the distance W are determined, as will be described below. Further, the angle θo of the light distribution is dependent on the light source 41, but is at least 45 degrees.

Parameter lines IDC illustrated in FIG. 21 satisfy the relationship of the following Equation (3).

$$z = \pm \frac{1}{\tan \theta_o} x \qquad (3)$$

As illustrated in FIG. 6, the first photoreceiver PD1 is arranged away from the third photoreceiver PD3 by the distance W across the arrangement center S0, and the second photoreceiver PD2 is arranged away from the fourth photoreceiver PD4 by the distance W across the arrangement center S0. Further, the first photoreceiver PD1, the third photoreceiver PD3, the second photoreceiver PD2, and the fourth photoreceiver PD4 have a width w, and there is a limitation that the width W is not smaller than a width 2w. The distance W from the arrangement center S0 to each of the first photoreceiver PD1, the second photoreceiver PD2, the third photoreceiver PD3, and the fourth photoreceiver PD4 is within a range in which the light distribution of the light source 41 is uniform, i.e., between the parameter lines IDC. Moreover, according to the Equation (3), a maximum value Dzmax and a minimum value Dzmin of the distance D between the emitting surface of the light source 41 and the arrangement center S0 (the optical sensor unit 35) satisfy the relationship of the following Equation (4) with respect to the distance W.

$$\frac{W \max}{2} \geq D \tan \theta_o \geq \frac{w}{2} \qquad (4)$$

The optical encoder unit 31 according to the first embodiment may use a light source 41 without a lens. By causing the distance D between the emitting surface of the light source 41 and the arrangement center S0 (the optical sensor unit 35) to be short, the SN ratio can be improved. The distance W from the arrangement center S0 to each of the first photoreceiver PD1, the second photoreceiver PD2, the third photoreceiver PD3, and the fourth photoreceiver PD4 may be within a range in which light can be received with less influence of light scattered by the light source 41. Accordingly, the optical encoder unit 31 and the optical encoder 2 may increase the measurement accuracy.

(Second Embodiment)

Figure 22:
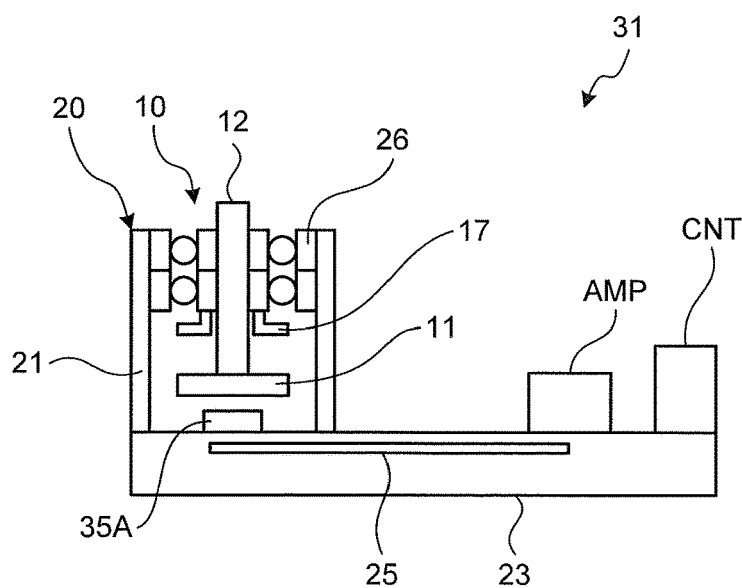
FIG. 22 is a structure diagram of an optical encoder unit according to a second embodiment.
Figure 23:
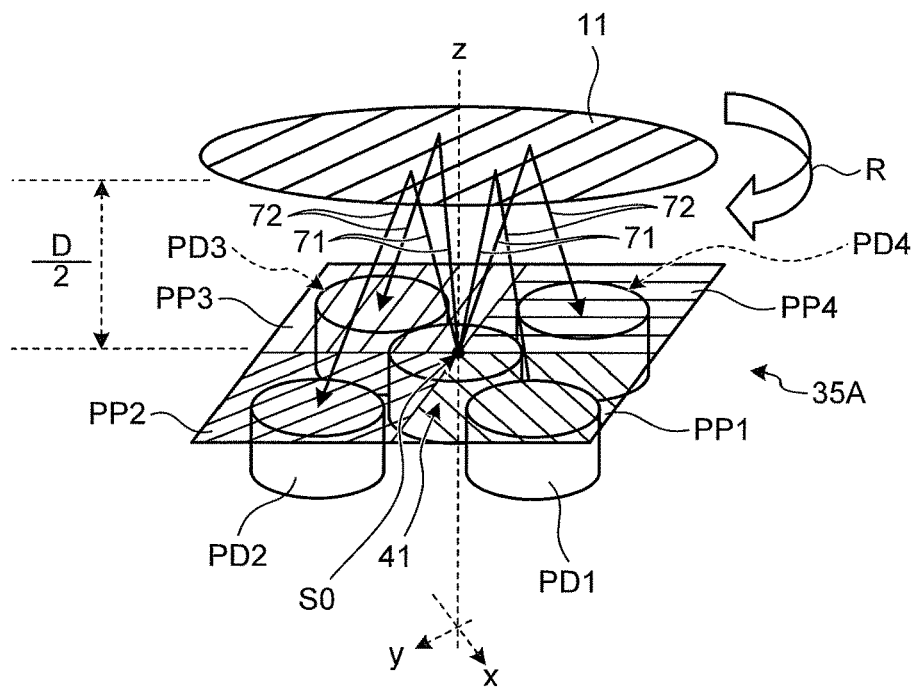
FIG. 23 is an explanatory diagram illustrating an arrangement example of an optical scale and an optical sensor unit according to the second embodiment.

FIG. 22 is a structure diagram of an optical encoder unit according to a second embodiment. FIG. 23 is an explanatory diagram illustrating an arrangement example of an optical scale and an optical sensor unit according to the second embodiment. Further, components that are the same as those described above are assigned with the same reference signs, and redundant description thereof is omitted. In the optical encoder unit 31, the light source light 71 of the light source 41 is reflected by the optical scale 11, and the reflected light is detected, as the incident light 72, by an optical sensor unit 35A including the first photoreceiver PD1, the third photoreceiver PD3, the second photoreceiver PD2, and the fourth photoreceiver PD4. The distance D between the emitting surface of the light source 41 and the arrangement center S0 (the optical sensor unit 35) is half of that of the first embodiment, because specular reflection is adopted. Further, as illustrated in FIG. 22, the optical encoder unit 31 according to the second embodiment includes an annular light-shielding plate 17. Accordingly, unnecessary reflection may be suppressed by the light-shielding plate 17, thereby increasing the measurement accuracy.

(Third Embodiment)

Figure 24:
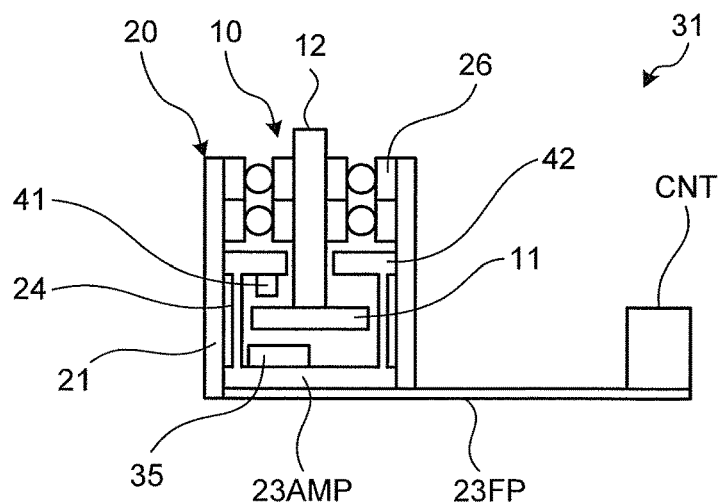
FIG. 24 is a structure diagram of an optical encoder unit according to a third embodiment.

FIG. 24 is a structure diagram of an optical encoder unit according to a third embodiment. Components that are the same as those described above are assigned with the same reference signs, and redundant description thereof is omitted. The optical encoder unit 31 according to the third embodiment is the same as that of the first embodiment in that a transmissive optical scale and optical sensor are arranged, but is different in that the substrate 23 is a flexible substrate 23FP. The preamplifier AMP has the optical sensor unit 35 directly stacked on a packaged amplifier. Since the preamplifier AMP is arranged inside the cover 21, the durability can be increased. The preamplifier AMP may have a photodetector and an amplifier circuit mounted on a bare chip. Further, the preamplifier AMP may have the photodetector and the amplifier circuit integrally formed in a semiconductor process.

(Fourth Embodiment)

Figure 25:
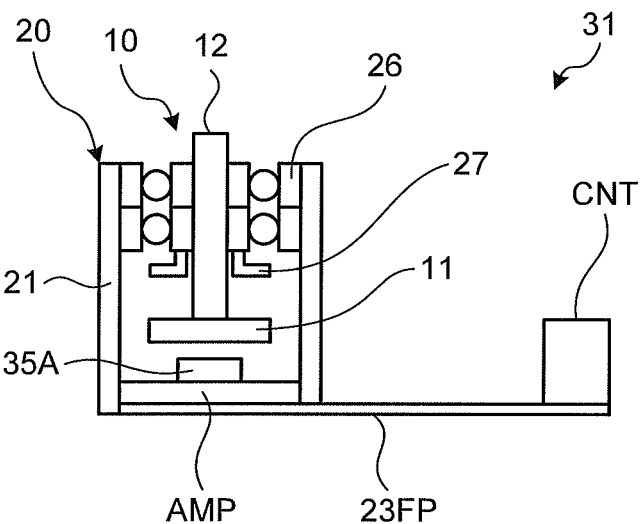
FIG. 25 is a structure diagram of an optical encoder unit according to a fourth embodiment.

FIG. 25 is a structure diagram of an optical encoder unit according to a fourth embodiment. Components that are the same as those described above are assigned with the same reference signs, and redundant description thereof is omitted. The optical encoder unit 31 according to the fourth embodiment is the same as that of the second embodiment in that a reflective optical scale and optical sensor are arranged, but is different in that the substrate 23 is a flexible substrate 23FP. The preamplifier AMP has the optical sensor unit 35A directly stacked on a packaged amplifier. Since the preamplifier AMP is arranged inside the cover 21, the durability can be increased. The preamplifier AMP may have a photodetector and an amplifier circuit mounted on a bare chip. Further, the preamplifier AMP may have the photodetector and the amplifier circuit integrally formed in a semiconductor process.

(Fifth Embodiment)

Figure 26:
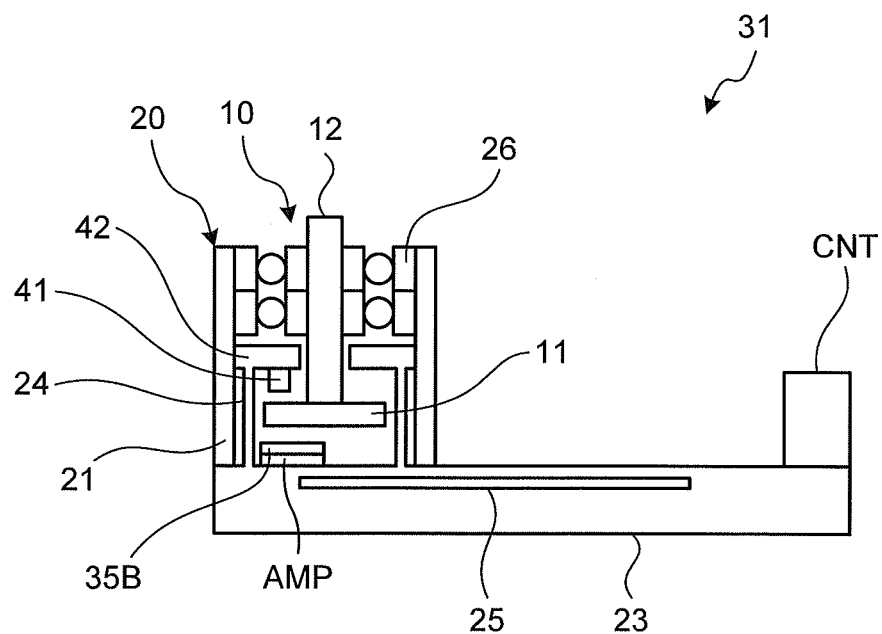
FIG. 26 is a structure diagram of an optical encoder unit according to a fifth embodiment.

FIG. 26 is a structure diagram of an optical encoder unit according to a fifth embodiment. Members that are the same as those described above are assigned with the same reference signs, and redundant description thereof is omitted. The optical encoder unit 31 according to the fifth embodiment is the same as that of the first embodiment in that a transmissive optical scale and optical sensor are arranged, but different in that the preamplifier AMP has an optical sensor unit 35B directly stacked on a packaged amplifier in which an integrated circuit of an amplifier circuit is packaged.

Figure 27:
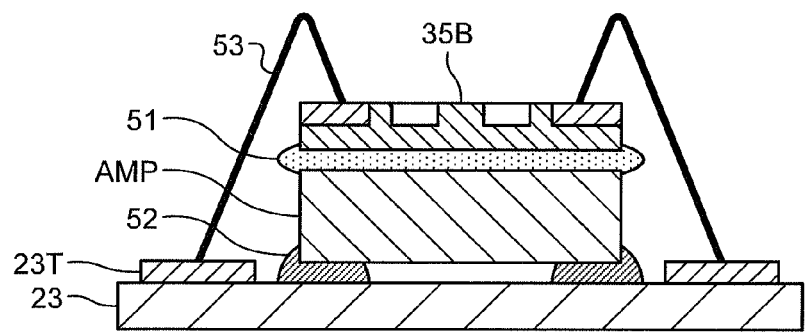
FIG. 27 is a structure diagram of an optical sensor unit according to the fifth embodiment.
Figure 28:
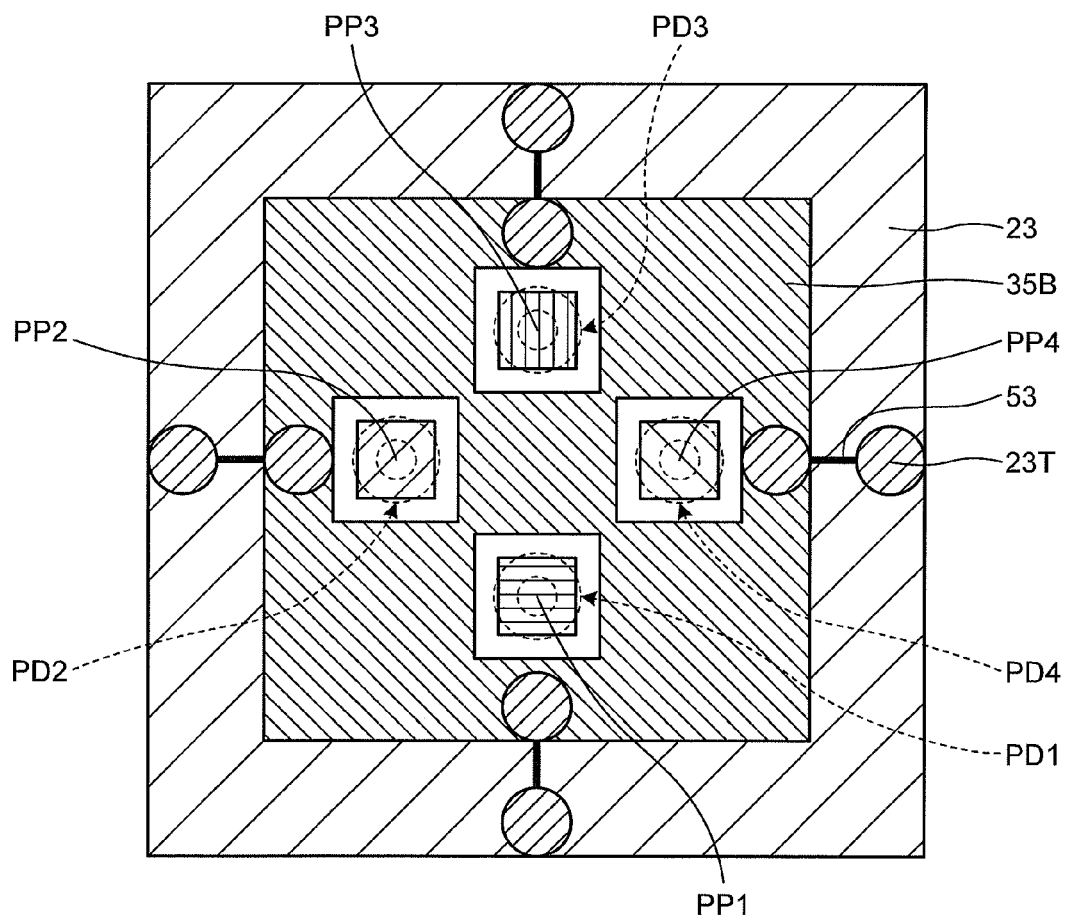
FIG. 28 is a plan view of the optical sensor unit illustrated in FIG. 27.

FIG. 27 is a structure diagram of an optical sensor unit according to a fifth embodiment. FIG. 28 is a plan view of the optical sensor unit illustrated in FIG. 27. As illustrated in FIGS. 27 and 28, the optical sensor unit 35B is a bare chip of a photodetector including the first photoreceiver PD1 having the polarizing layer PP1, the second photoreceiver PD2 having the polarizing layer PP2, the third photoreceiver PD3 having the polarizing layer PP3, and the fourth photoreceiver PD4 having the polarizing layer PP4. The optical sensor unit 35B is a bare chip, and is not packaged. The optical sensor unit 35B is fixed above the preamplifier AMP by an adhesive layer 51.

As illustrated in FIG. 27, the preamplifier AMP is mounted on the surface of the substrate 23, and the substrate 23 electrically connects the preamplifier AMP to lands of bonding members 52 made of a conductive molten metal such as solder or a conductive resin and connected to a line 24 of the substrate 23 illustrated in FIG. 26. Accordingly, by melting a conductive molten metal in the form of a ball or paste interposed between the preamplifier AMP and the substrate 23 by a reflow device or the like, the preamplifier AMP is easily fixed and electrically connected to the substrate 23.

Furthermore, a bonding device connects a terminal 23T that is connected to the line 24 of the substrate 23 mentioned above to each terminal of the optical sensor unit 35B by a conductive metal wire 53 made of Au or the like. Therefore, even if the optical sensor unit 35B is integrated on the preamplifier AMP, and the outer shape of the cover 21 is small, the preamplifier AMP and the optical sensor unit 35B are provided inside the cover 21 (see FIG. 26). As a result, the optical encoder unit 31 according to the fifth embodiment is made small. Moreover, with the optical encoder unit 31 according to the fifth embodiment, the process may be at least partly automated by the reflow device, the bonding device, or the like, and the cost can be reduced. Since the connection distance of the signal line between the preamplifier AMP and the optical sensor unit 35B becomes short, the signal noise can be reduced and the accuracy can be further increased for the optical sensor unit 35B according to the fifth embodiment.

Figure 29:
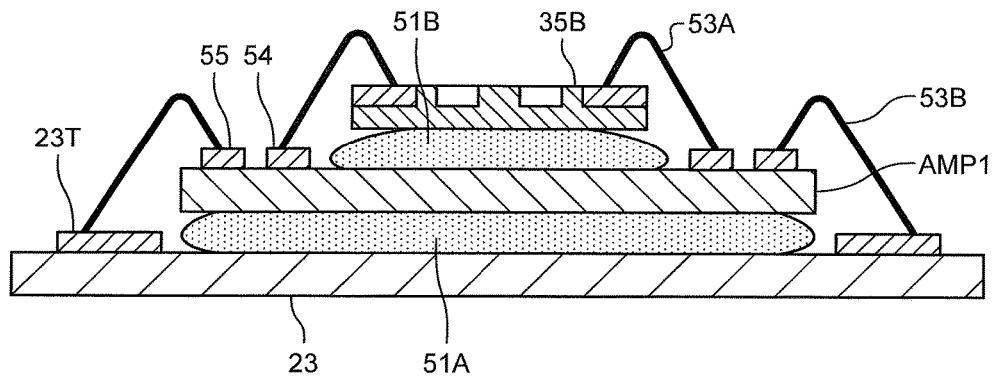
FIG. 29 is a structure diagram of an optical sensor unit according to a first modification of the fifth embodiment.
Figure 30:
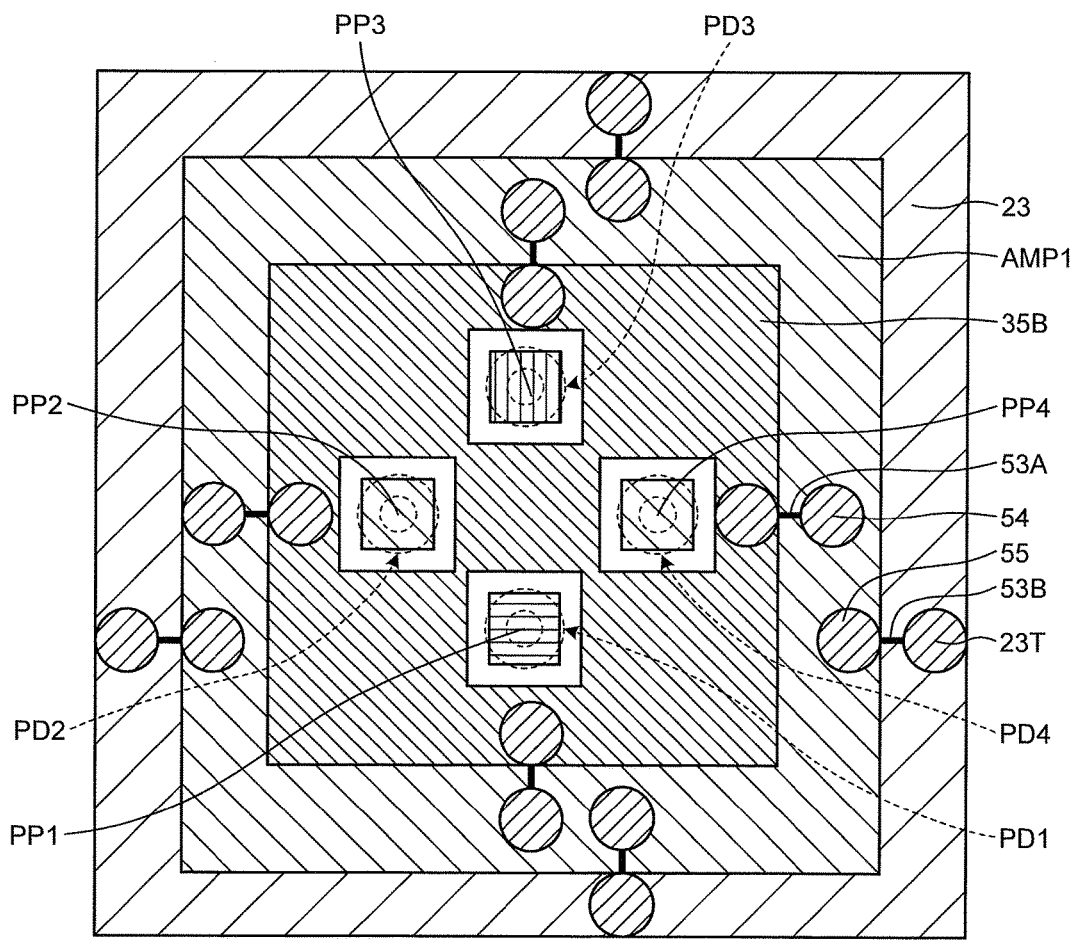
FIG. 30 is a plan view of the optical sensor unit illustrated in FIG. 29.

FIG. 29 is a structure diagram of an optical sensor unit according to a first modification of the fifth embodiment. FIG. 30 is a plan view of the optical sensor unit in FIG. 29. As illustrated in FIGS. 29 and 30, with the optical sensor unit 35B according to the first modification of the fifth embodiment, a preamplifier AMP1 is not packaged but is a bare chip, and the optical sensor unit 35B is fixed above the preamplifier AMP1 by an adhesive layer 51B.

In the optical sensor unit according to the first modification of the fifth embodiment, the bonding device connects the terminal 23T connected to the line 24 of the substrate 23 mentioned above to each terminal 55 of the preamplifier AMP1 by a conductive metal wire 53B made of Au or the like. An adhesive layer 51A is interposed between the substrate 23 and the preamplifier AMP1, and an adhesive layer 51B is interposed between the preamplifier AMP1 and the optical sensor unit 35B. As a result, the positions of the substrate 23, the preamplifier AMP1, and the optical sensor unit 35B are fixed.

Furthermore, the bonding device connects each terminal 54 of the preamplifier AMP1 to each terminal of the optical sensor unit 35B by a conductive metal wire 53A made of Au or the like. The terminals 54 of the preamplifier AMP1 and the terminals of the optical sensor unit 35B have to be connected such that the terminals 54 of the preamplifier AMP1 at the lower side are exposed when the preamplifier AMP1 and the optical sensor unit 35B are stacked together. Therefore, the bare chip of the preamplifier AMP1 has a chip size that is greater than that of the bare chip of the optical sensor unit 35B.

Consequently, even if the optical sensor unit 35B is integrated on the preamplifier AMP1, and the outer shape of the cover 21 is small, the preamplifier AMP1 and the optical sensor unit 35B are provided inside the cover 21. Since both the preamplifier AMP1 and the optical sensor unit 35B are bare chips and thus are thin, the optical encoder unit 31 according to the first modification of the fifth embodiment is made small. Moreover, with the optical encoder unit 31 according to the first modification of the fifth embodiment, the process may be at least partly automated by the bonding device or the like, and the cost can be reduced. Since the connection distance of the signal line between the preamplifier AMP1 and the optical sensor unit 35B is short, the signal noise can be reduced and the accuracy can be further increased for the optical sensor unit 35B according to the first modification of the fifth embodiment.

Figure 31:
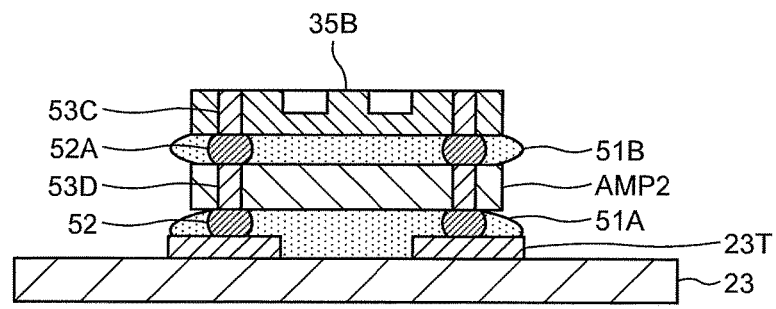
FIG. 31 is a structure diagram of an optical sensor unit according to a second modification of the fifth embodiment.
Figure 32:
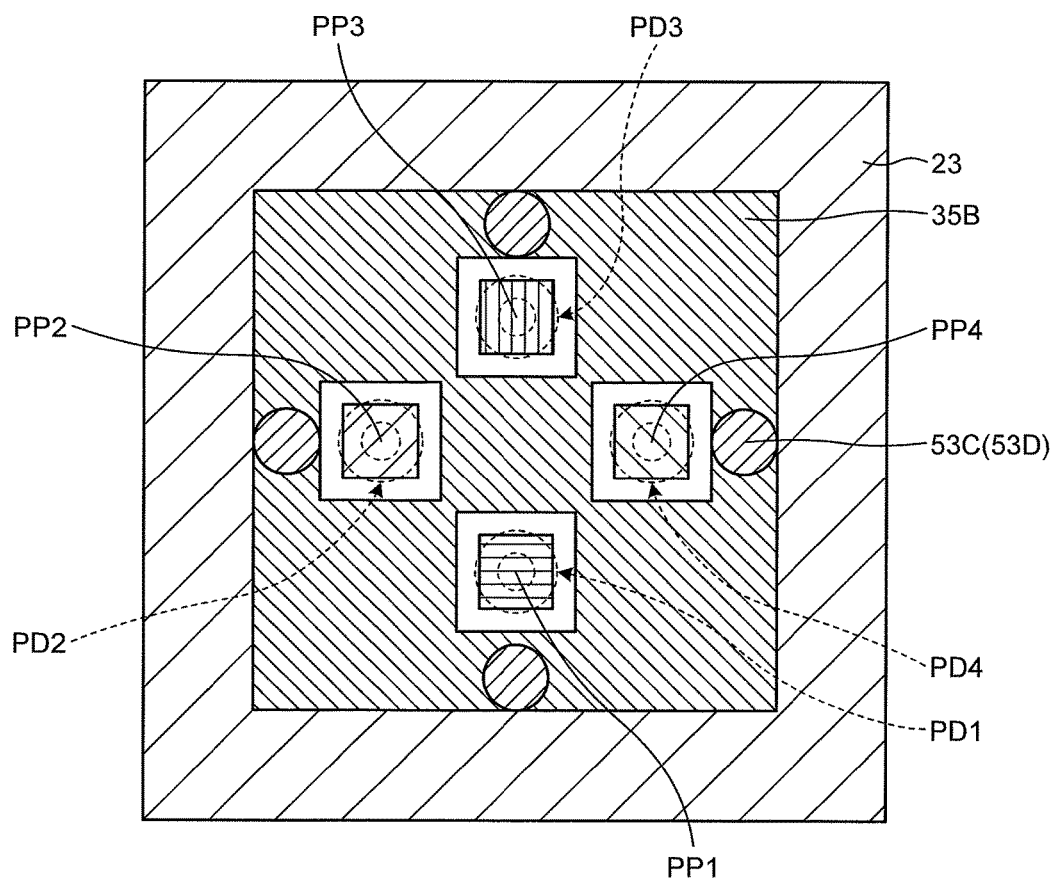
FIG. 32 is a plan view of the optical sensor unit illustrated in FIG. 31.

FIG. 31 is a structure diagram of an optical sensor unit according to a second modification of the fifth embodiment. FIG. 32 is a plan view of the optical sensor unit illustrated in FIG. 31. As illustrated in FIGS. 31 and 32, with the optical sensor unit 35B according to the second modification of the fifth embodiment, a preamplifier AMP2 is not packaged but is a bare chip, and the optical sensor unit 35B is fixed above the preamplifier AMP2 by an adhesive layer 51A. The bare chip of the optical sensor unit 35B includes conductive penetrating lines 53C penetrating the upper surface and the lower surface. The bare chip of the preamplifier AMP2 also includes conductive penetrating lines 53D penetrating the upper surface and the lower surface. The penetrating lines 53C and the penetrating lines 53D are arranged at respective bare chips in such a way that, when the optical sensor unit 35B and the preamplifier AMP2 are stacked together, the penetrating lines 53C and the penetrating lines 53D are overlapped with each other in plan view.

In the optical sensor unit according to the second modification of the fifth embodiment, the reflow device connects the terminals 23T connected to the line 24 of the substrate 23 mentioned above to the penetrating lines 53D of the preamplifier AMP2 by bonding members 52 made of a conductive metal, such as solder.

Furthermore, the reflow device connects the penetrating lines 53D of the preamplifier AMP2 to the penetrating lines 53C of the optical sensor unit 35B by bonding members 52A made of a conductive metal, such as solder. The adhesive layer 51A is interposed between the substrate 23 and the preamplifier AMP2, and the adhesive layer 51B is interposed between the preamplifier AMP2 and the optical sensor unit 35B. As a result, the positions of the substrate 23, the preamplifier AMP2, and the optical sensor unit 35B are fixed.

With the optical sensor unit according to the second modification of the fifth embodiment, the outer shape of the preamplifier AMP2 does not have to be exposed when the penetrating lines 53D of the preamplifier AMP2 and the penetrating lines 53C of the optical sensor unit 35B are stacked together. Accordingly, the bare chip of the preamplifier AMP2 only needs to have a chip size that is equal to or smaller than that of the bare chip of the optical sensor unit 35B. Therefore, even if the optical sensor unit 35B is integrated on the preamplifier AMP2, and the outer shape of the cover 21 is small, the preamplifier AMP2 and the optical sensor unit 35B are provided inside the cover 21. Since both the preamplifier AMP2 and the optical sensor unit 35B are bare chips and thus are made thin and small, the optical encoder unit 31 according to the second modification of the fifth embodiment is further miniaturized. Moreover, with the optical encoder unit 31 according to the second modification of the fifth embodiment, the process may be at least partly automated by the reflow device or the like, and the cost can be reduced. Since the connection distance of the signal line between the preamplifier AMP2 and the optical sensor unit 35B is made short, the signal noise can be reduced and the accuracy can be further increased for the optical sensor unit 35B according to the second modification of the fifth embodiment.

Figure 33:
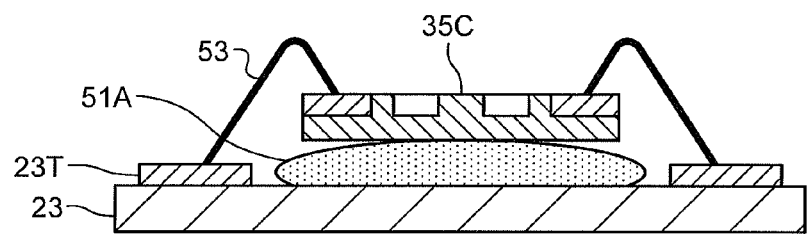
FIG. 33 is a structure diagram of an optical sensor unit according to a third modification of the fifth embodiment.
Figure 34:
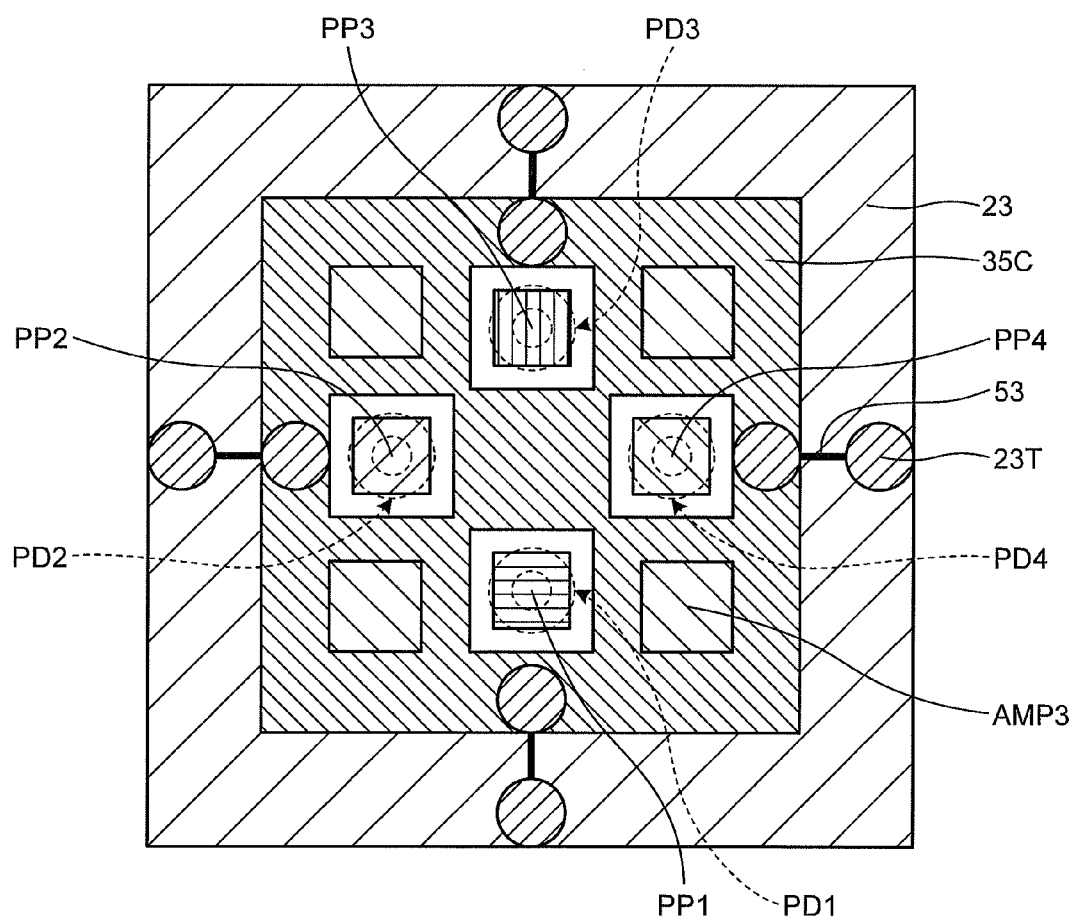
FIG. 34 is a plan view of the optical sensor unit illustrated in FIG. 33.

FIG. 33 is a structure diagram of an optical sensor unit according to a third modification of the fifth embodiment. FIG. 34 is a plan view of the optical sensor unit illustrated in FIG. 33. As illustrated in FIGS. 33 and 34, an optical sensor unit 35C according to the third modification of the fifth embodiment is integrated with a preamplifier AMP3 and is fixed, as a bare chip, above the substrate 23 by an adhesive layer 51A.

As illustrated in FIGS. 33 and 34, the optical sensor unit 35C is a bare chip in which a photodetector and amplifiers AMP3 are formed as a semiconductor integrated circuit. The photodetector includes the first photoreceiver PD1 having the polarizing layer PP1, the second photoreceiver PD2 having the polarizing layer PP2, the third photoreceiver PD3 having the polarizing layer PP3, and the fourth photoreceiver PD4 having the polarizing layer PP4. The optical sensor unit 35C is a bare chip and is not packaged. Each of the photoreceivers PD1 to PD4 of the optical sensor unit 35C is connected to the preamplifier AMP3 in the integrated circuit (in the bare chip).

The optical sensor unit 35C is mounted on the surface of the substrate 23, and the substrate 23 electrically connects the terminal 23T connected to the line 24 of the substrate 23 mentioned above to each preamplifier AMP3 of the optical sensor unit 35C by a conductive metal wire 53 made of Au or the like.

In the optical sensor unit according to the third modification of the fifth embodiment, the optical sensor unit 35C and the preamplifiers AMP3 are integrated together. Therefore, even if the outer shape of the cover 21 is small, the optical sensor unit 35C and the preamplifiers AMP3 are provided inside the cover 21. The optical sensor unit 35C is one bare chip, and thus is thin and small. As a result, the optical encoder unit 31 according to the third modification of the fifth embodiment can be made small. Moreover, with the optical encoder unit 31 according to the third modification of the fifth embodiment, the process may be at least partly automated by the bonding device or the like, and the cost can be reduced. Since the connection distance of the signal line between the preamplifier AMP3 and the optical sensor unit 35B is short, the signal noise can be reduced and the accuracy can be further increased for the optical sensor unit 35B according to the third modification of the fifth embodiment.

Figure 35:
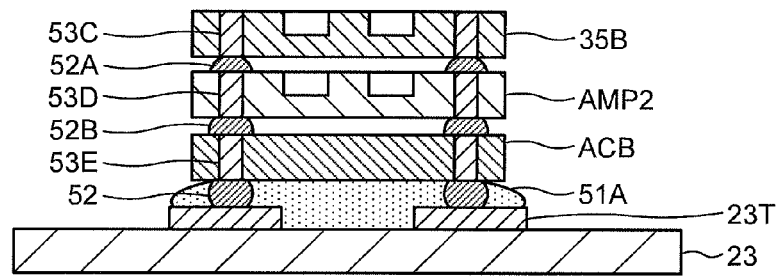
FIG. 35 is a structure diagram of an optical sensor unit according to a fourth modification of the fifth embodiment.
Figure 36:
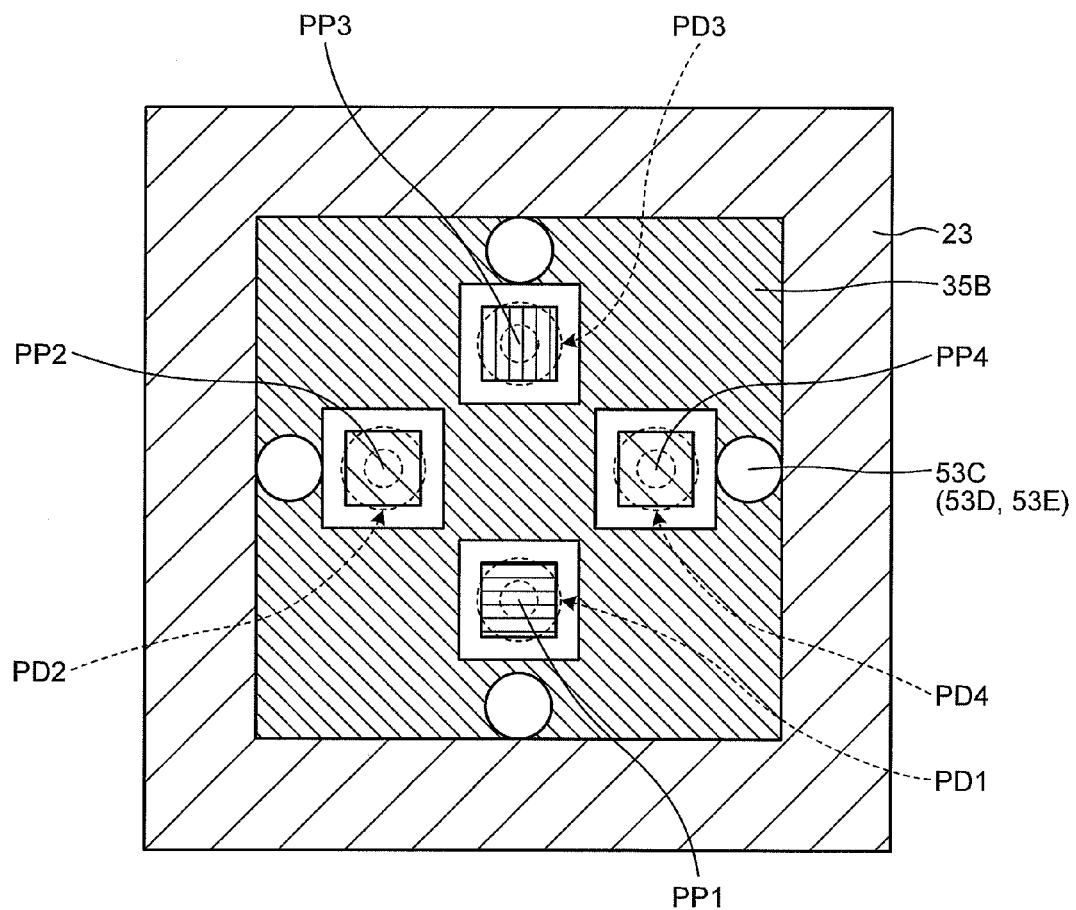
FIG. 36 is a plan view of the optical sensor unit illustrated in FIG. 35.

FIG. 35 is a structure diagram of an optical sensor unit according to a fourth modification of the fifth embodiment. FIG. 36 is a plan view of the optical sensor unit in FIG. 35. As illustrated in FIGS. 35 and 36, with the optical sensor unit 35B according to the fourth modification of the fifth embodiment, the preamplifier AMP2 is not packaged but is a bare chip, and the optical sensor unit 35B is fixed above the preamplifier AMP2 by bonding members 52A. With the optical sensor unit 35B according to the fourth modification of the fifth embodiment, an operational circuit ACB is not packaged but is a bare chip, and the preamplifier AMP2 is fixed above the operational circuit ACB by bonding members 52B. The bonding members 52A and the bonding members 52B are made of the same conductive material as that of the bonding members 52 described above. The operational circuit ACB described here is an integrated circuit having the function of the differential operational circuit DS described in the first embodiment. The operational circuit ACB may be an integrated circuit having the functions of the filter circuit NR and the multiplication circuit AP, in addition to that of the differential operational circuit DS described in the first embodiment. The bare chip of the optical sensor unit 35B includes the conductive penetrating lines 53C penetrating the upper surface and the lower surface. The bare chip of the preamplifier AMP2 also includes the conductive penetrating lines 53D penetrating the upper surface and the lower surface. The bare chip of the operational circuit ACB also includes conductive penetrating lines 53E penetrating the upper surface and the lower surface. The penetrating lines 53C, the penetrating lines 53D, and the penetrating lines 53E are arranged in respective bare chips such that, when the optical sensor unit 35B, the preamplifier AMP2, and the operational circuit ACB are stacked together, the penetrating lines 53C, the penetrating lines 53D, and the penetrating lines 53E are overlapped with one another in plan view.

In the optical sensor unit according to the fourth modification of the fifth embodiment, the reflow device connects the terminals 23T connected to the line 24 of the substrate 23 mentioned above to the penetrating lines 53E of the operational circuit ACB by the bonding members 52 made of a conductive metal, such as solder.

Furthermore, the reflow device connects the penetrating lines 53E of the operational circuit ACB to the penetrating lines 53D of the preamplifier AMP2 by bonding members 52B made of a conductive metal, such as solder. Further, the reflow device connects the penetrating lines 53D of the preamplifier AMP2 to the penetrating lines 53C of the optical sensor unit 35B by the bonding members 52A made of a conductive metal, such as solder. The adhesive layer 51A is interposed between the substrate 23 and the operational circuit ACB, and the positions of the substrate 23 and the operational circuit ACB are fixed.

With the optical sensor unit according to the fourth modification of the fifth embodiment, the bare chips of the operational circuit ACB and the preamplifier AMP2 only need to have a chip size that is equal to or smaller than that of the bare chip of the optical sensor unit 35B. Therefore, even if the optical sensor unit 35B is integrated on the operational circuit ACB and the preamplifier AMP2 and the outer shape of the cover 21 is small, the operational circuit ACB, the preamplifier AMP2, and the optical sensor unit 35B are provided inside the cover 21. All of the operational circuit ACB, the preamplifier AMP2, and the optical sensor unit 35B are bare chips and are made thin and small. As a result, the optical encoder unit 31 according to the fourth modification of the fifth embodiment can be made small. Moreover, with the optical encoder unit 31 according to the fourth modification of the fifth embodiment, the process may be at least partly automated by the reflow device or the like, and the cost can be reduced. Since the connection distance of the signal line between the preamplifier AMP2 and the optical sensor unit 35B is short, the signal noise can be reduced and the accuracy can be further increased for the optical sensor unit 35B according to the fourth modification of the fifth embodiment.

The optical sensor units 35B according to each of the fifth embodiment and the modifications thereof may be combined as appropriate with other structural elements described above. For example, the substrate 23 may be provided as the flexible substrate 23FP described in the second embodiment.

REFERENCE SIGNS LIST

2 Optical encoder
3 Calculation processing device
5 Control unit
10 Rotor
11 Optical scale
12 Shaft
17 Light-shielding plate
20 Stator
21 Cover
23 Substrate
23FP Flexible substrate
24, 25 Line
26 Bearing
30 Unit base member
30b Surface
31 Optical encoder unit
35, 35A, 35B Optical sensor unit
39a First polarizing layer
39b Second polarizing layer
41 Light source
41T Emitting surface
71 Light source light
72, 73 Incident light
AMP Preamplifier
AP Multiplication circuit
CNT Connector
D Distance
Vc Differential signal
Vs Differential signal

The invention claimed is:

1. An optical encoder unit comprising:
a light source having a predetermined light distribution:
an optical scale having a polarizer whose polarization direction on a plane is along a predetermined direction, and whose polarization direction is changed according to rotation; and
an optical sensor unit including a first photoreceiver, a second photoreceiver, a third photoreceiver, and a fourth photoreceiver for receiving incident light that is light source light from the light source made incident on the respective photoreceivers by passing through or being reflected by the optical scale,
wherein, when an emitting surface of the light source and the optical sensor unit are arranged at positions with a distance D therebetween that is equal to or less than a maximum value Dzmax such that the optical sensor unit receives a light intensity that is 100 times greater or more than that corresponding to dark current of the optical sensor unit, the optical sensor unit outputs a signal of the light intensity,
wherein the first photoreceiver, the second photoreceiver, the third photoreceiver, and the fourth photoreceiver are respectively arranged at an equal distance from an arrangement center,
wherein the following expression (1) holds:

$$W\max/2 \geq D \tan \theta o \geq w/2 \tag{1}$$

where an angle $\theta o$ is an angle of light distribution dependent on the light source;
a distance W is a distance between the first photoreceiver and the third photoreceiver across the arrangement center and between the second photoreceiver and the fourth photoreceiver across the arrangement center:
a width w is a width of the first photoreceiver, that of the second photoreceiver, that of the third photoreceiver, and that of the fourth photoreceiver, the distance W being more than a twofold width 2w of the width w; and
a maximum value Wmax is a maximum value of the distance W when the distance D is the maximum value Dzmax,
wherein the first photoreceiver, the second photoreceiver, the third photoreceiver, and the fourth photoreceiver are each positioned within a range in which the light distribution of the light source is uniform, and
wherein the optical scale has signal tracks on one side thereof, the signal tracks being formed in a wire grid pattern.

2. The optical encoder unit according to claim 1, wherein when the distance D between the emitting surface of the light source and the optical sensor unit is such that the optical sensor unit receives a light intensity that is 1000 times greater or more than that corresponding to the dark current of the optical sensor unit the optical sensor unit outputs a signal of the light intensity.

3. The optical encoder unit according to claim 1, wherein the first photoreceiver, the second photoreceiver, the third photoreceiver, and the fourth photoreceiver receive light by polarizing layers that split the incident light in different polarization directions.

4. The optical encoder unit according to claim 1, further comprising a cylindrical cover, and a shaft that is capable of freely rotating by being supported by a bearing attached inside the cover, wherein the cover encloses the optical scale attached to the shaft, the light source, and the optical sensor unit.

5. The optical encoder unit according to claim 1, further comprising:

a first bare chip including the first photoreceiver, the second photoreceiver, the third photoreceiver, and the fourth photoreceiver, and an amplifier circuit for amplifying signals of the first photoreceiver, the second photoreceiver, the third photoreceiver, and the fourth photoreceiver, wherein the first bare chip and the amplifier circuit are fixed at positions so as to overlap each other in a plan view and are electrically connected to each other.

6. The optical encoder unit according to claim 1, further comprising a bare chip that includes the first photoreceiver, the second photoreceiver, the third photoreceiver, and the fourth photoreceiver, and on which an amplifier circuit for amplifying signals of the first photoreceiver, the second photoreceiver, the third photoreceiver, and the fourth photoreceiver are integrated.

7. An optical encoder comprising:

an optical encoder unit. according to claim 1; and a calculation processing device that calculates an amount of relative movement between the optical scale and the optical sensor unit from light intensities detected by the first photoreceiver, the second photoreceiver, the third photoreceiver, and the fourth photoreceiver.

8. The optical encoder according to claim 7, wherein the calculation processing device calculates an amount of absolute movement between the optical scale and the optical sensor unit by storing in a storage device, and reading from the storage device at a time of activation, whether a rotation position of the optical scale is in a range equal to or more than zero degrees and less than 180 degrees, or in a range equal to or more than 180 degrees and less the 360 degrees.

* * * * *